(12) United States Patent
de Jong et al.

(10) Patent No.: US 9,588,306 B2
(45) Date of Patent: Mar. 7, 2017

(54) FIBER OPTIC MODULE ASSEMBLIES AND CONNECTOR ASSEMBLIES USING THE SAME

(71) Applicant: Corning Cable Systems LLC, Hickory, NC (US)

(72) Inventors: Michael de Jong, Colleyville, TX (US); Carl Randall Harrison, Decatur, TX (US); Craig Alan Strause, Springtown, TX (US)

(73) Assignee: CORNING CABLE SYSTEMS LLC, Hickory, NC (US)

(*) Notice: Subject to any disclaimer, the term of this patent is extended or adjusted under 35 U.S.C. 154(b) by 741 days.

(21) Appl. No.: 13/838,278

(22) Filed: Mar. 15, 2013

(65) Prior Publication Data

US 2015/0268425 A1    Sep. 24, 2015

Related U.S. Application Data

(60) Provisional application No. 61/636,159, filed on Apr. 20, 2012.

(51) Int. Cl.
*G02B 6/32* (2006.01)
*G02B 6/42* (2006.01)

(52) U.S. Cl.
CPC ............ *G02B 6/4214* (2013.01); *G02B 6/423* (2013.01); *G02B 6/425* (2013.01); *G02B 6/4212* (2013.01); *G02B 6/4239* (2013.01)

(58) Field of Classification Search
None
See application file for complete search history.

(56) References Cited

U.S. PATENT DOCUMENTS

| 2011/0123151 | A1 | 5/2011 | Zbinden et al. ................. 385/33 |
| 2011/0150400 | A1 | 6/2011 | Nishimura et al. ............. 385/83 |
| 2012/0008902 | A1 | 1/2012 | Wu ................................. 385/77 |
| 2012/0189254 | A1 | 7/2012 | Wang et al. .................... 385/93 |
| 2013/0230280 | A1* | 9/2013 | Kadar-Kallen ...... G02B 6/4204 385/33 |

FOREIGN PATENT DOCUMENTS

| WO | WO 2010036684 A2 * | 4/2010 | ........... G02B 6/0288 |
| WO | 2010036684 A3 | 8/2010 | |
| WO | WO2014151204 A1 | 9/2014 | ............... G02B 6/32 |

* cited by examiner

*Primary Examiner* — Omar R Rojas

(57) ABSTRACT

Fiber optic module assemblies and optical-electrical connectors incorporating the same are disclosed. The fiber optic module assembly generally includes a total-internal-reflection ("TIR") module having TIR body including a TIR surface to direct light to active optical components. The TIR body is coupled to a lens module including a lens body having a plurality of lens surfaces. A plurality of optical fibers may be secured within fiber support features of the TIR body that aligns ends of the optical fibers to the lenses defined by the lens body. Alignment features and index-matching adhesive may be used to couple the TIR body to the lens body. Optical-electrical connectors employing such two-piece fiber optic module assemblies are also disclosed, as well as kits of parts for providing optical communication of light between an active optical component and an optical fiber.

18 Claims, 22 Drawing Sheets

FIBER OPTIC MODULE ASSEMBLIES AND CONNECTOR ASSEMBLIES USING THE SAME

PRIORITY

This application claims the benefit of priority under 35 U.S.C. §119 of U.S. Provisional Application Ser. No. 61/636,159 filed on Apr. 20, 2012 the content of which is relied upon and incorporated herein by reference in its entirety.

FIELD

The present disclosure generally relates to fiber optic module assemblies and, more particularly, to fiber optic module assemblies and optical-electrical connectors having a fiber tray coupled to a TIR module that employs total internal reflection.

BACKGROUND

Short-distance data links used for consumer electronics are reaching increasingly higher data rates, especially those used for video and data storage applications. Examples include the USB 3.0 protocol at 5 Gb/s, HDMI at 10 Gb/s and Thunderbolt™ at 10 Gb/s over two channels. At such high data rates, traditional copper cables have limited transmission distance and cable flexibility. For at least these reasons, optical fiber is emerging as an alternative to copper wire for accommodating the high data rates for the next generations of consumer electronics.

Unlike telecommunication applications that employ expensive, high-power edge-emitting lasers along with modulators, short-distance optical fiber links are based on low-cost, low-power, directly modulated light sources such as vertical-cavity surface-emitting lasers (VCSELs). To be viable for consumer electronics, the TIR modules and assemblies used to couple light from the light source into an optical fiber in one direction and light traveling in another optical fiber onto the photodiode in the other direction need to be low-cost. This requirement drives the need for the design of TIR modules and assemblies to be simple to manufacture while having suitable performance. Accordingly, there is an unresolved need for TIR modules that simplify the alignment of optical fibers using an active alignment process.

SUMMARY

Embodiments of the present disclosure relate to two-piece fiber optic module assemblies including a total-internal-reflection ("TIR") module having a total-internal-reflection ("TIR") surface and a lens module having a plurality of lens surfaces. The TIR module is coupled to the lens module to form a plurality of lenses having a folded optical axis. A plurality of optical fibers is positioned in fiber support features of the TIR module such that the fiber ends are positioned at a reference fiber-end datum surface. Accordingly, the fiber-end datum surface provides a known location for the fiber ends of the plurality of optical fibers such that they are substantially aligned with the folded optical axes of the plurality of lenses. Methods of processing optical fibers using a fiber tray are also disclosed.

An aspect of the disclosure is a fiber optic module assembly including a total-internal-reflection (TIR) module having a TIR body that is transmissive to light having a predetermined wavelength and a lens module having a lens body that is also transmissive to light having the predetermined wavelength. The TIR body includes a first surface and a second surface that is opposite from the first surface, and a TIR surface extending from the first surface. The TIR surface is operable to reflect an optical signal of light propagating within the TIR body by total internal reflection. The lens body includes a first surface and a second surface that is opposite from the first surface, wherein the second surface of the TIR body is coupled to the first surface of the lens body, and a plurality of lens surfaces formed on the second surface of the lens body. At least the plurality of lens surfaces and the TIR surface define a plurality of lenses, each lens having a folded optical axis.

Another aspect of the disclosure is the aforementioned fiber optic module assembly, wherein the TIR body extends beyond an edge of the lens body.

Another aspect of the disclosure is any aforementioned fiber optic module assembly, wherein the lens body includes at least one attachment feature configured to be coupled to a substrate.

Another aspect of the disclosure is any aforementioned fiber optic module assembly, wherein the plurality of lens surfaces includes one or more first lens surfaces and one or more second lens surfaces, wherein the one or more first lens surfaces are offset with respect to the one or more second lens surfaces in a direction that is orthogonal to the first surface of the lens body.

Another aspect of the disclosure is any aforementioned fiber optic module assembly, wherein the second surface of the TIR body is adhered to the first surface of the lens body with an index matching adhesive.

Another aspect of the disclosure is any aforementioned fiber optic module assembly, wherein the TIR body includes at least one alignment feature at the second surface of the TIR body, and the lens body includes at least one alignment feature at the first surface of the lens body that is configured to engage the at least one alignment feature of the TIR body.

Another aspect of the disclosure is the aforementioned fiber optic module assembly, wherein the at least one alignment feature of the TIR body includes an alignment pin and an alignment bore, and the at least one alignment feature of the lens body includes an alignment bore configured to receive the alignment pin of the TIR body, and an alignment pin configured to be disposed in the alignment bore of the TIR body.

Another aspect of the disclosure is any aforementioned fiber optic module assembly, wherein the TIR body includes a plurality of module fiber support features configured to receive a plurality of optical fibers and to align the plurality of optical fibers with the folded optical axes of the plurality of lenses.

Another aspect of the disclosure is the aforementioned fiber optic module assembly, wherein the TIR body includes a fiber tray recess and the fiber optic module assembly further includes a fiber tray. The fiber tray includes a first surface, a first edge, a second edge opposite from the first edge, and a plurality of fiber support features extending from the first edge to the second edge on the first surface. The plurality of fiber support features is configured to receive the plurality of optical fibers, and the fiber tray is disposed in the fiber tray recess of the TIR body such that the plurality of fiber support features of the fiber tray is substantially aligned with the plurality of module fiber support features of the TIR body.

Another aspect of the disclosure is a fiber optic module assembly including a total-internal-reflection (TIR) module and a lens module that are transmissive to light having a predetermined wavelength. The TIR module has a TIR body that includes a first surface and a second surface that is opposite from the first surface, a TIR surface extending from the first surface, wherein the TIR surface is operable to reflect an optical signal of light propagating within the TIR body by total internal reflection, a fiber-end datum surface located proximate the TIR surface such that optical signals propagating through the fiber-end datum surface are reflected at the TIR surface, and a plurality of module fiber support features terminating at the fiber-end datum surface. The plurality of optical fibers is disposed in the plurality of module fiber support features and fiber-ends of the plurality of optical fibers are positioned at the fiber-end datum surface. The lens module has a lens body that includes a first surface and a second surface that is opposite from the first surface, wherein the second surface of the TIR body is coupled to the first surface of the lens body, and a plurality of lens surfaces formed on the second surface of the lens body. The plurality of lens surfaces, the TIR surface, the fiber-end datum surface and intervening portions of the lens body and the TIR body define a plurality of lenses, each lens having a folded optical axis. The plurality of optical fibers is substantially aligned with the folded optical axes of the plurality of lenses.

Another aspect of the disclosure is the aforementioned fiber optic module assembly, wherein the TIR body includes at least one alignment feature at the second surface of the TIR body, and the lens body includes at least one alignment feature at the first surface of the lens body that is configured to engage the at least one alignment feature of the TIR body.

Another aspect of the disclosure is any aforementioned fiber optic module assembly, wherein the at least one alignment feature of the TIR body includes an alignment pin and an alignment bore, and the at least one alignment feature of the lens body includes an alignment bore configured to receive the alignment pin of the TIR body, and an alignment pin configured to be disposed in the alignment bore of the TIR body.

Another aspect of the disclosure is any aforementioned fiber optic module assembly, wherein the at least one alignment features of the TIR body and the lens body align the plurality of module fiber support features with the folded optical axes of the plurality of lenses.

Another aspect of the disclosure is any aforementioned fiber optic module assembly, wherein the TIR body includes a fiber insertion edge, and the plurality of module fiber support features extend between the fiber insertion edge and the fiber-end datum surface.

Another aspect of the disclosure is any aforementioned fiber optic module assembly, wherein each fiber support feature of the plurality of module fiber support features includes a coating portion that tapers to a core portion.

Another aspect of the disclosure is any aforementioned fiber optic module assembly, wherein the TIR body includes a plurality of fiber hold-down features extending from the fiber-end datum surface and positioned above the plurality of fiber support features.

Another aspect of the disclosure is any aforementioned fiber optic module assembly, wherein the lens body includes at least one attachment feature configured to be coupled to a substrate.

Another aspect of the disclosure is any aforementioned fiber optic module assembly, wherein the plurality of lens surfaces includes one or more first lens surfaces and one or more second lens surfaces, wherein the one or more first lens surfaces are offset with respect to the one or more second lens surfaces in a direction that is orthogonal to the first surface of the lens body.

Another aspect of the disclosure is any aforementioned fiber optic module assembly, wherein the second surface of the TIR body is adhered to the first surface of the lens body with an index matching adhesive.

Another aspect of the disclosure is a kit of parts for providing optical communication of light between an active optical component and an optical fiber. The kit of parts includes a total-internal-reflection (TIR) module and a lens module that are transmissive to light having a predetermined wavelength. The TIR module has a TIR body that includes a first surface and a second surface that is opposite from the first surface, a TIR surface extending from the first surface, wherein the TIR surface is operable to reflect an optical signal of light propagating within the TIR body by total internal reflection, a fiber-end datum surface located proximate the TIR surface such that optical signals propagating through the fiber-end datum surface are reflected at the TIR surface, and a plurality of module fiber support features configured to receive a plurality of optical fibers. The plurality of module fiber support features terminates at the fiber-end datum surface. The lens module has a lens body that includes a first surface and a second surface that is opposite from the first surface, and a plurality of lens surfaces formed on the second surface of the lens body. The plurality of lens surfaces, the TIR surface, the fiber-end datum surface and intervening portions of the lens body and the TIR body define a plurality of lenses, each lens having a folded optical axis.

Another aspect of the disclosure is the aforementioned kit of parts, wherein the TIR body includes at least one alignment feature at the second surface of the TIR body, and the lens body includes at least one alignment feature at the first surface of the lens module that is configured to engage the at least one alignment feature of the TIR body.

Another aspect of the disclosure is any aforementioned kit of parts, wherein the at least one alignment feature of the TIR body includes an alignment pin and an alignment bore, and the at least one alignment feature of the lens body includes an alignment bore configured to receive the alignment pin of the TIR body, and an alignment pin configured to be disposed in the alignment bore of the TIR body.

Another aspect of the disclosure is any aforementioned kit of parts, wherein the TIR body includes a fiber tray recess, and the kit of parts further includes a fiber tray including a first surface, a first edge, a second edge opposite from the first edge, and a plurality of fiber support features extending from the first edge to the second edge on the first surface. The plurality of fiber support features is configured to receive the plurality of optical fibers and the fiber tray is configured to be disposed in the fiber tray recess of the TIR body such that the plurality of fiber support features of the fiber tray is substantially aligned with the plurality of module fiber support features of the TIR body.

Another aspect of the disclosure is any aforementioned kit of parts, wherein the plurality of lens surfaces includes one or more first lens surfaces and one or more second lens surfaces, wherein the one or more first lens surfaces are offset with respect to the one or more second lens surfaces in a direction that is orthogonal to the first surface of the lens body.

Another aspect of the disclosure is an optical-electrical connector including a substrate having a surface and a plurality of active optical components coupled to the surface, a plurality of optical fibers, each optical fiber having a core surrounded by an outer coating, and a total-internal-reflection (TIR) module that is transmissive to light having a predetermined wavelength. Each optical fiber includes a stripped region where the core is exposed for a length from a fiber-end. The TIR module has a TIR body that includes a first surface and a second surface that is opposite from the first surface, a TIR surface extending from the first surface, wherein the TIR surface is operable to reflect an optical signal of light propagating within the TIR body by total internal reflection, a fiber-end datum surface located proximate the TIR surface such that optical signals propagating through the fiber-end datum surface are reflected at the TIR surface, and a plurality of module fiber support features configured to receive a plurality of optical fibers. The plurality of module fiber support features terminates at the fiber-end datum surface. The optical-electrical connector further includes a lens module having a lens body that is transmissive to light having the predetermined wavelength. The lens body includes a first surface and a second surface that is opposite from the first surface, wherein the second surface of the TIR body is coupled to the first surface of the lens body, and a plurality of lens surfaces formed on the second surface of the lens body. The plurality of lens surfaces, the TIR surface, the fiber-end datum surface and intervening portions of the lens body and the TIR body define a plurality of lenses, each lens having a folded optical axis. The plurality of module fiber support features is substantially aligned with the folded optical axes of the plurality of lenses. The lens body is coupled to the surface of the substrate such that the folded lens axes of the plurality of lenses are substantially aligned with device axes of the plurality of active optical components.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various embodiments of the disclosure and together with the description set forth herein serve to explain the principles and operations of the disclosure. The claims are incorporated into and constitute part of the Detailed Description set forth below.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 1:
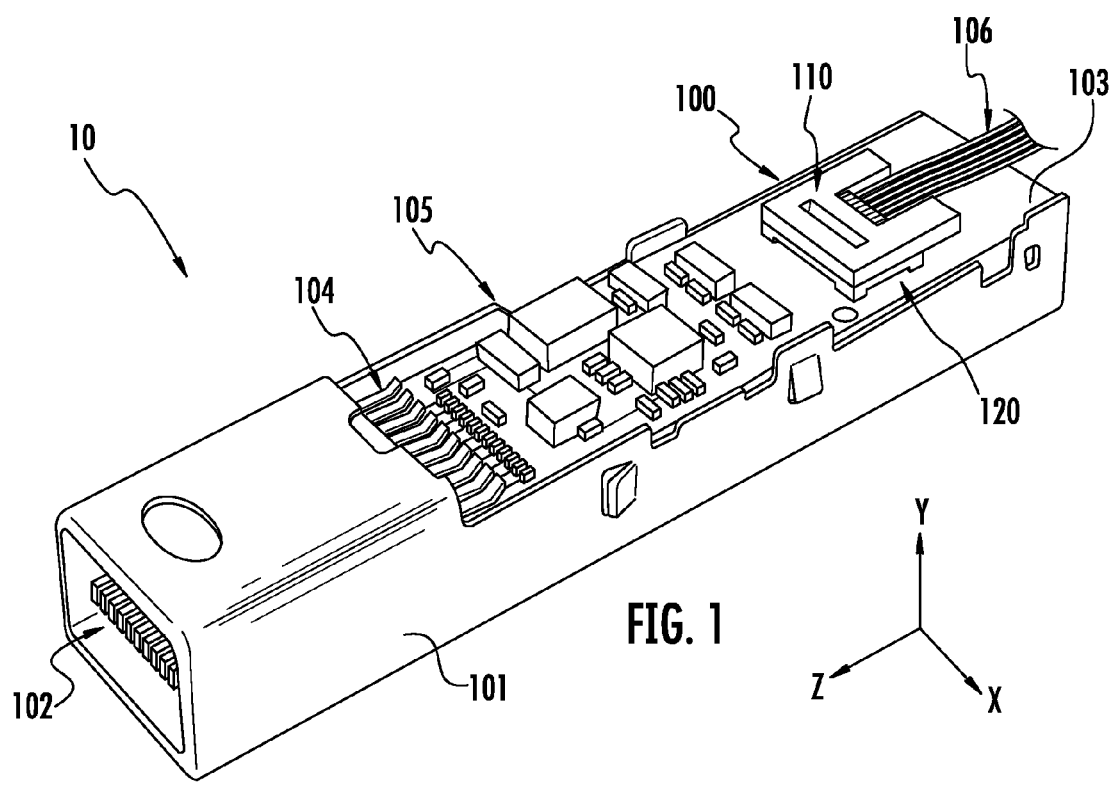
FIG. 1 is a top-down elevated view of an example optical-electrical connector including a fiber optic module assembly according to one or more embodiments of the disclosure.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Embodiments of the present disclosure relate to fiber optic module assemblies and optical-electrical connectors and, more particularly, to fiber optic module assemblies and optical-electrical connectors that employ total-internal-reflection ("TIR") to provide optical signals of light between active optical components, such as light source devices (lasers, light emitting diodes, and the like), and photodetector devices (e.g., photodiodes). Embodiments also relate to methods of processing and aligning optical fibers with lenses of the fiber optic module assemblies.

Referring generally to the figures, embodiments are directed to two-piece fiber optic module assemblies including a TIR module having a TIR surface and a lens module having one or more lens surfaces. A surface of the TIR module is coupled to a surface of the lens module to create a one or more lenses having a folded optical axis. The TIR module may be coupled to the lens module by use of an index-matching adhesive, for example, and/or one or more alignment and engagement features.

As an example and not a limitation, the lens module may be coupled to a substrate (e.g., a printed circuit board) having one or more active optical components mounted thereon such that the one or more lenses are substantially aligned with the one or more active optical components. The lens module may be mounted on the substrate during the population of the substrate with other electrical (and non-electrical) components. The lens module may then be coupled to the TIR module to provide one or more lenses having a folded optical axis. The lens module may be easier to visually place on the substrate with the one or more lens surfaces aligned with the one or more active components prior to coupling the TIR module to the lens module. For example, the TIR surface of the TIR module may interfere with the ability to see the location of the one or more lens surfaces and the one or more active components if the TIR module is coupled to the lens module prior to mounting the lens module on the substrate. However, TIR module and the lens module may be coupled together prior to mounting the lens module on the substrate in some embodiments.

Embodiments may also include a fiber tray that is coupled to the TIR module. Optical fibers of an optical cable assembly are first inserted into fiber support features (e.g., grooves) of the fiber tray and then further processed (e.g., laser stripping one or more coating layers to expose the optical fiber core or cladding). The fiber tray is then positioned in the TIR module and secured by an adhesive, before or after the TIR module is coupled to the lens module. The fiber ends of the optical fibers extending from the fiber tray are actively positioned within fiber support features (e.g., grooves) of the TIR module (e.g., by use of a microscope or other vision system) and secured to the TIR module at the fiber support features with an index-matching adhesive. The fiber ends are actively aligned and positioned such that they are positioned at (i.e., contact or nearly contact) a reference fiber-end datum surface such that they are aligned with a plurality of lenses defined by the lens module.

Use of the fiber tray enables simultaneous processing of multiple optical fibers prior to insertion into the TIR module, which may reduce fabrication time and cost. Further, the fiber tray secures the loose optical fibers at a location close to the fiber ends such that the positioning of the stripped portion of the optical fibers in the fiber support features of the TIR module by an active alignment process is more manageable. Various embodiments of fiber optic module assemblies, fiber trays, optical-electrical connector, and methods of processing optical fibers are described in detail below.

Referring now to FIG. 1, an exemplary optical-electrical connector 10 of an active optical cable assembly is depicted. It should be understood that embodiments of the present disclosure are not limited to any connector standard or configuration. Embodiments described herein may be directed to optical-electrical connectors or cable assemblies. The term "optical-electrical" is used to describe the optical-electrical connector because it performs optical-to-electrical and an electrical-to-optical conversions within the connector. In other words, the optical-electrical connector has electrical contacts for connectivity to a device along with active electronics inside for converting the electrical signals to optical signals and vice-versa for transmission along an optical waveguide such as an optical fiber attached to a module of the connector. Exemplary connector types include, but are not limited to, USB 3.0, HDMI, Thunderbolt™ and FireWire®. Generally, active optical cable assemblies convert electrical signals from an electrical device at a first optical-electrical connector into optical signals that are transmitted over one or more optical fibers. A second optical-electrical connector 10 at the opposite end of the active optical cable assembly then receives the optical signals from the one or more optical fibers, converts the optical signals into electrical signals, and transmits the converted electrical signals to another electronic device that is electrically coupled to the second optical-electrical connector 10.

Figure 2:
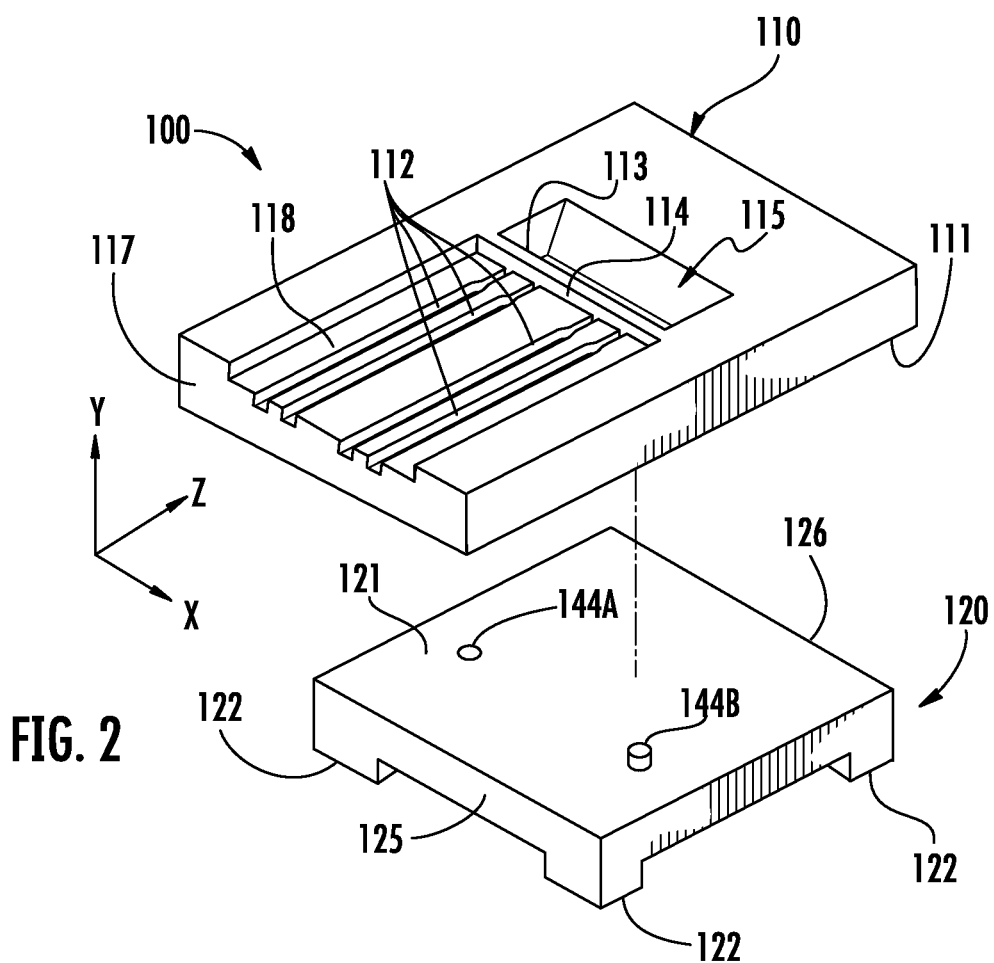
FIG. 2 is a top-down elevated view of an exampled fiber optic module assembly in a disassembled state according to one or more embodiments of the disclosure.
Figure 3:
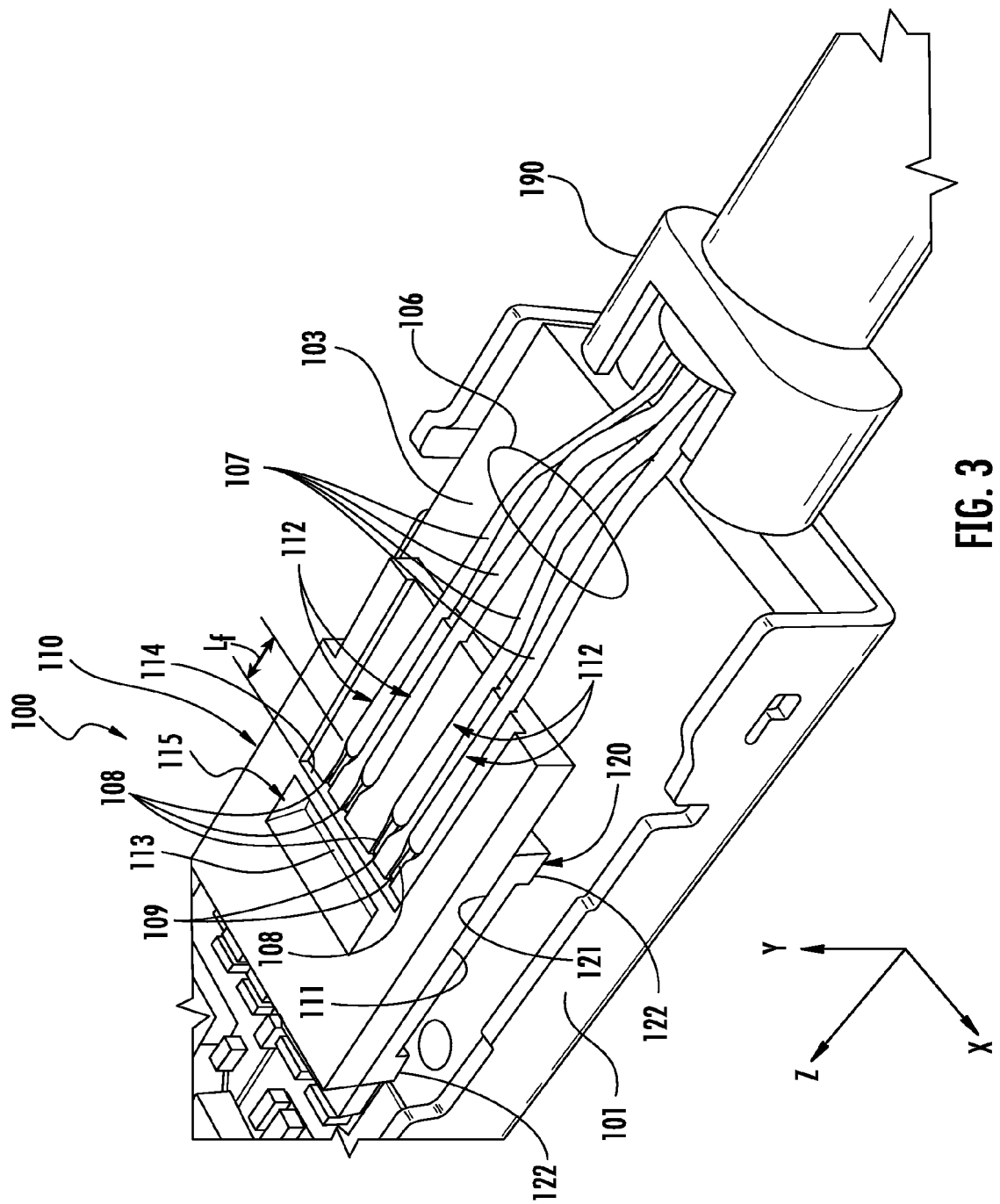
FIG. 3 is a close-up, top-down elevated view of the optical-electrical connector of FIG. 1 showing the fiber optic module assembly.

The exemplary optical-electrical connector 10 depicted in FIG. 1 generally includes an outer housing 101 (it is noted that a top portion of the outer housing is not depicted in FIG. 1 to illustrate internal components) that maintains an electric connector 102, a substrate 103 (e.g., a printed circuit board ("PCB") made of a material such as FR-4, for example), various electronic components 105 (e.g., components for receiving electrical signals, driving light source devices, receiving signals from photodiode devices, and the like), conductive elements 104 electrically coupling the electric connector 102 to the circuit defined by the various electronic components 105, a fiber optic module assembly 100 for providing optical signals of light to and from active optical components 140D, 140S (not visible in FIG. 1, see FIGS. 7A and 7B) underneath the fiber optic module assembly 100, and a plurality of optical fibers 106 of an optical cable. Active optical components include devices capable of transmitting and/or receiving light. Light source devices 140S acting as a transmitting active optical component may include, but are not limited to light emitting diodes and laser diodes, such as vertical-cavity surface-emitting lasers ("VC- SEL"). Photodetector 140D acting as a receiving active optical component may include photodiode, for example. The various electronic components 105 may be configured as integrated circuits capable of driving the active optical components 140D, 140S, for example. Any number of active optical components 140D, 140S may be utilized, depending on the communication protocol. In the illustrated embodiment, two light source devices 140S and two photodetectors 140D are used. Generally, the fiber optic module assembly 100 includes a TIR module 110 that maintains a portion of the optical fibers and comprises a TIR surface, and a lens module 120 that includes one or more lens surfaces. As described in more detail below, the TIR module 110 and the lens module 120 are separate components that, when coupled together, create one or more lenses positioned between a fiber-end datum surface 114 and the one or more lens surfaces 134, 135. In embodiments, the fiber optic module assembly 100 (or fiber optic module assembly 200 described below) may be provided as a kit of parts for optically coupling optical fibers to active optical components. FIG. 2 is a perspective view of a fiber optic module assembly 100 in a disassembled state, and FIG. 3 is a perspective view of an assembled fiber optic module assembly 100 coupled to a PCB substrate 103 of the optical-electrical connector 10 depicted in FIG. 1. Fiber ends 109 of optical fibers 106 extending from an optional strain relief element 190 are secured to the TIR module 110. The TIR module 110 is configured to be coupled to the lens module 120 using optional alignment features 141A, 141B on the TIR module 110 (not shown in FIG. 1) alignment features 144A, 144B on the lens module 120. An underside surface 111 of the TIR module 110 may be coupled to an upper surface 121 of the lens module by an index-matching adhesive such that optical signals may pass through the interface of the underside surface 111 and the upper surface 121 without substantial loss due to Fresnel reflection. An exemplary UV curing index-matched adhesive may include, but is not limited to, Nextgen UV AB14 manufactured by Nextgen Adhesives. It should be understood that other index-matched adhesives may be used.

TIR Module

Figure 4A:
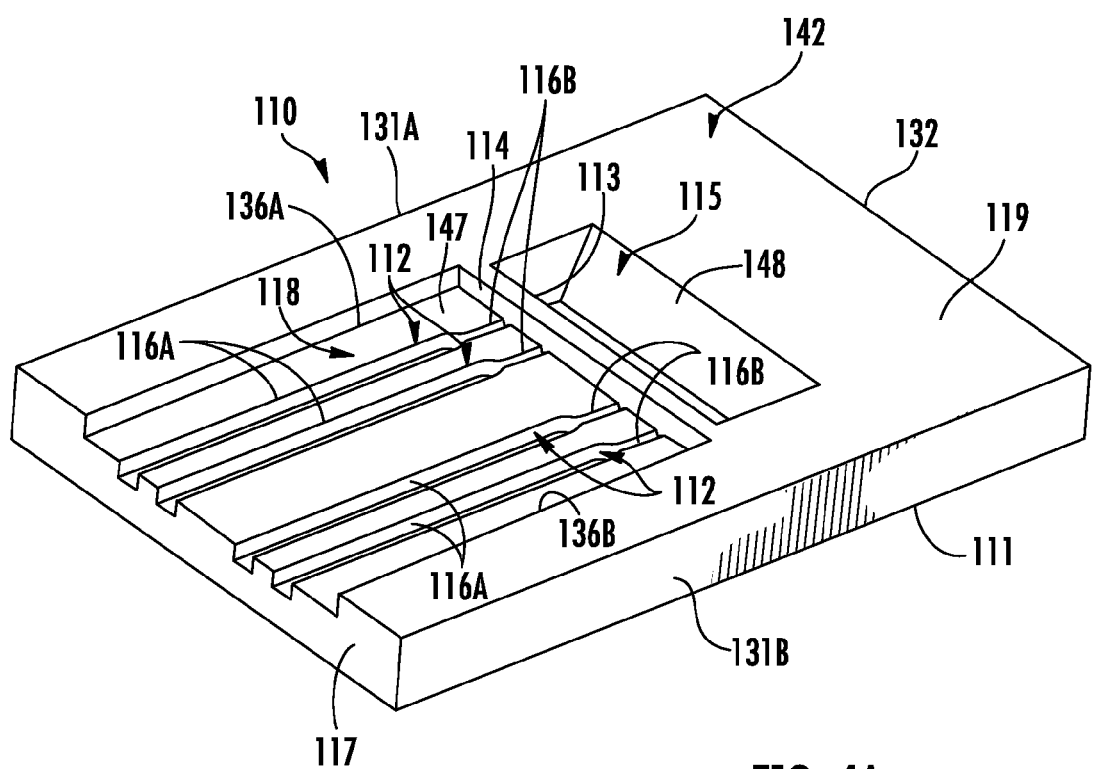
FIG. 4A is a top-down elevated view of a total-internal-reflection ("TIR") module of the fiber optic module assembly depicted in FIGS. 1 through 3.
Figure 4A:
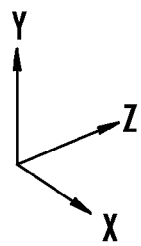
Figure 4B:
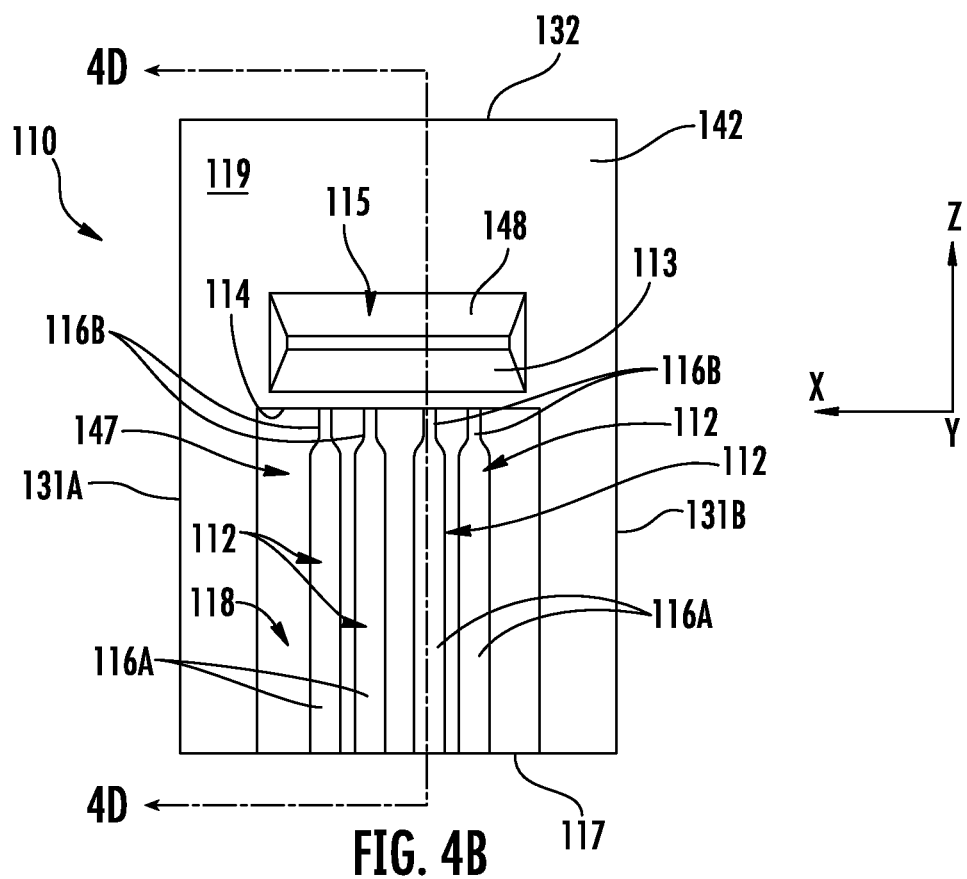
FIG. 4B is a top-down view of the TIR module depicted in FIG. 4A.
Figure 4C:
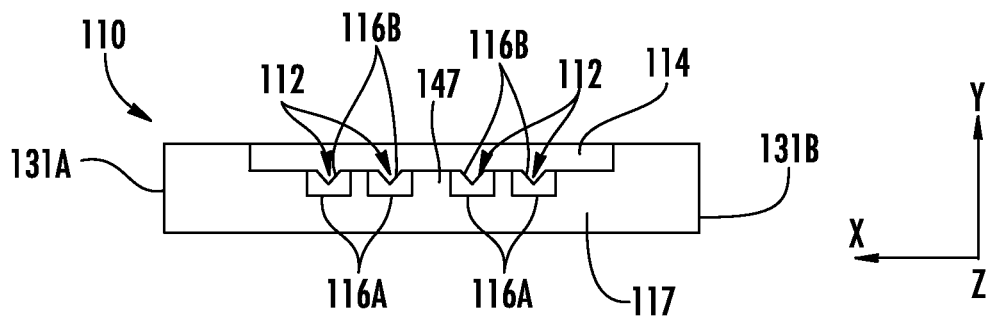
FIG. 4C is a rear view of the TIR module depicted in FIGS. 4A and 4B.
Figure 4D:
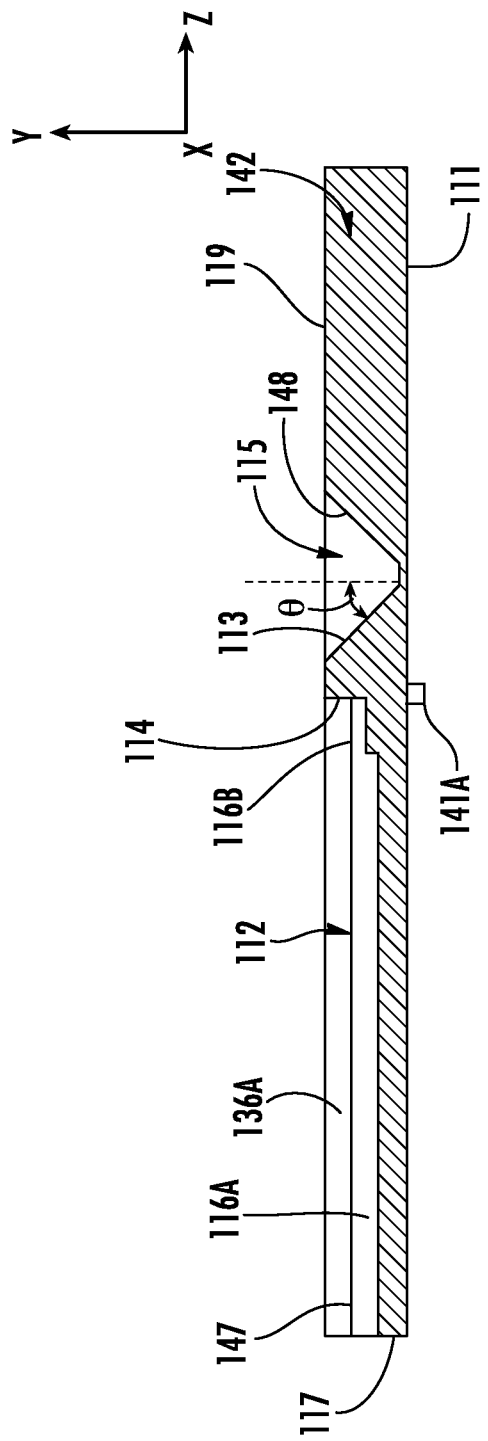
FIG. 4D is a cross-sectional view of the TIR module depicted in FIG. 4C taken along line 4C-4C.
Figure 4E:
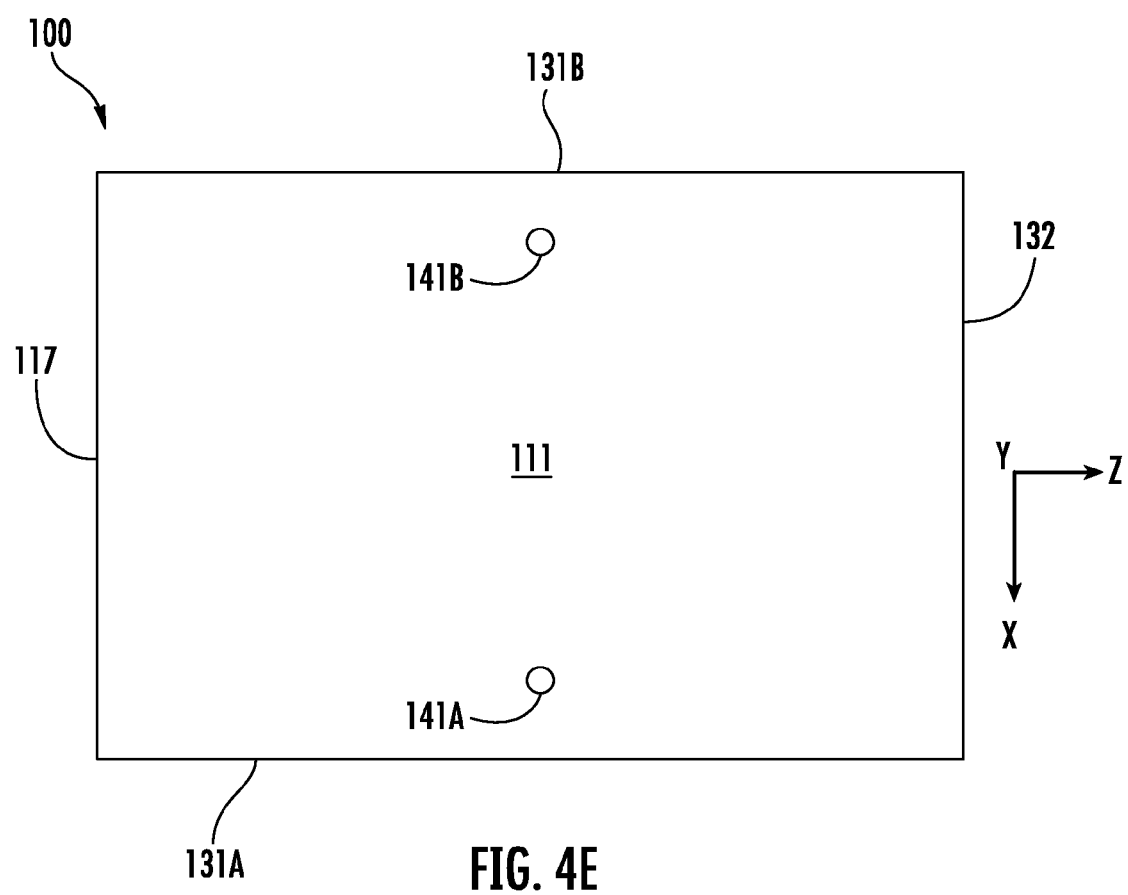
FIG. 4E is a bottom-up view of the TIR module depicted in FIGS. 4A through 4D.

Referring to FIGS. 4A-4E, an exemplary TIR module 110 configured to be coupled to the lens module 120 depicted in FIGS. 1-3 is illustrated. FIG. 4A is a top-down elevated view of an exemplary TIR module 110, while FIG. 4B is a top view of the TIR module 110, FIG. 4C is a rear view of the TIR module 110, and FIG. 4D is a cross-sectional view of the TIR module 110 taken along line 4D-4D of FIG. 4C. FIG. 4E is a bottom view of the TIR module 110.

Generally, the TIR module 110 is configured to redirect optical signals of light emitted from the fiber ends 109 of the optical fibers 106 toward lens surfaces 134, 135 of the lens module 120, and redirect optical signals of light received from the lens surfaces 134, 135 into the optical fibers 106. The TIR module 110 has a TIR body 142 that is made of a material that is transmissive to light having a predetermined wavelength λ, according to the particular optical communication protocol, such as an IR wavelength λ, in the range of 800 nm to 1,100 nm, which is the wavelength range of VCSELs used in forming optical data links. As used herein, transmissive means that optical signals are able to pass through the material without significant losses. Other predetermined wavelengths λ may be used, such as wavelengths in the visible spectrum, for example.

In an example embodiment, the TIR body of the TIR module 110 is formed from a transparent resin such as Polyetherimide (PEI) sold by the General Electric Company under the trademarked name ULTEM® 1010, which has a refractive index of about n=1.64 in the aforementioned IR wavelength range. In an example, the TIR body is monolithic and is formed, for example, by molding, by machining or by a combination of both molding and machining. In an example, the mold is made of steel and is precision micromachined so that the features of TIR body are formed with high precision to provide fine optical alignment between fiber ends 109 and active optical components. In embodiments, the precise features of the TIR body, such as the fiber support features 112, may be formed by injection molding using a mold fabricated by a single-point diamond turning process ("SPDT"), or by wire electrical discharge machining ("EDM"), for example.

The TIR body has a first end 117, a second end 132 substantially opposite from the first end, a first surface 119, and a second surface 111 opposite the first surface 119. The TIR body further comprises opposing sides 131A, 131B. Within the first surface 119 is a fiber support recess 118 that defines first and second sidewalls 136A, 136B, and a fiber-end datum surface 114. The fiber support recess of the illustrated embodiment extends from the first end 117 to the fiber-end datum surface 114. As described in more detail below, the fiber-end datum surface 114 provides a stop for fiber-ends of optical fibers disposed in the fiber support recess 118.

The fiber support recess 118 also defines a floor 147 in which a plurality of module fiber support features 112 are disposed. The plurality of module fiber support features 112 are parallel to the Z-direction, and are configured to accept and maintain a plurality of optical fibers 106, as shown in FIG. 3. Referring to FIG. 3, four optical fibers 106 are disposed within four module fiber support features 112 configured as grooves. An example optical fiber 106 is a multi-mode optical fiber, such as, for example, a large-core, high-numerical-aperture optical fiber, e.g., the VSDN™ optical fiber, available from Corning Incorporated of Corning, N.Y. Example optical fibers 106 are also discussed in published PCT Patent Application Publication No. WO2010036684, entitled "High numerical aperture multi-mode optical fiber," which is incorporated by reference herein. Each optical fiber 106 has a central core 108 ("core") having an index of refraction $n_C$. The core 108 that is surrounded by a cladding (not shown) having an index of refraction $n_{CL}$, where $n_{CL}<n_C$. In an example, the optical fiber 106 has a numerical aperture $NA_F$=0.29. Also in an example, the core 108 has a gradient-index profile, which in an example is a parabolic profile. In an example, the core 108 has a diameter of about 80 microns. The core 108 and cladding of each optical fiber 106 is surrounded by a coating 107. The coating 107 may comprise one or more layers of material. The coating layer may be an acrylate material, for example.

Figure 11A:
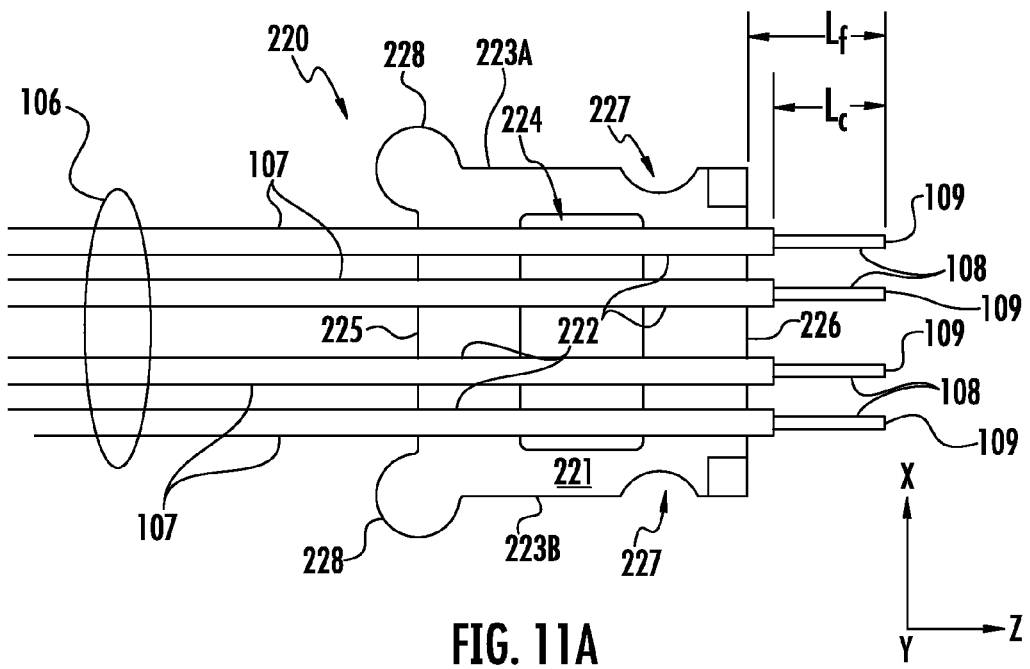
FIG. 11A is a top view of the fiber tray depicted in FIGS. 10A through 10D populated with optical fibers.
Figure 11B:
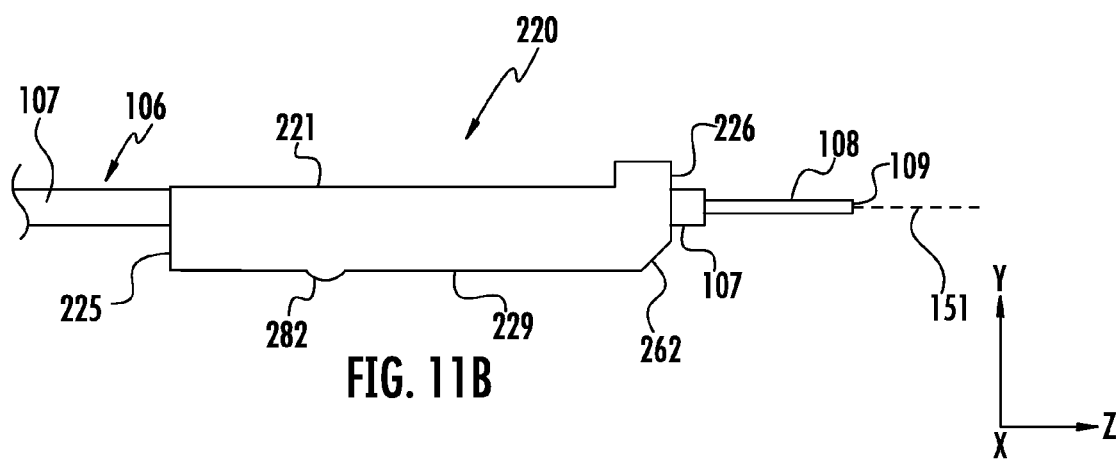
FIG. 11B is a side view of the populated fiber tray depicted in FIG. 10A.

Each optical fiber 106 is stripped to expose the core 108 (or cladding), and then may be cleaved substantially perpendicular to the fiber axis such that stripped portion exposing the core 108 has a length $L_c$. The core 108 of each optical fiber 106 has a central axis 151 as depicted in FIG. 11B, and has a fiber-end 109. As an example and not a limitation, a laser source may be used to remove the coating 107, such as the laser stripping process offered by OpTek Systems of Abingdon, UK, for example. Other laser stripping methods may also be utilized. Additionally, non-laser stripping methods may be used to strip the coating material, such as chemical, mechanical or hot gas stripping. The stripped optical fiber 106 may be cleaved by laser cleaving or mechanical cleaving, for example. In some embodiments, the optical fibers 106 are not cleaved after being disposed in the fiber tray 220. An exemplary laser cleaving system includes, but is not limited to, laser cleaving systems offered by OpTek Systems of Abingdon, UK.

The fiber support features 112 of the fiber support recess 118 are dimensioned to accept the coated portion 107 and the stripped portion (core 108) of the optical fibers 106. As shown in FIG. 4A, each module fiber support feature 112 comprises a first groove segment 116A dimensioned to receive the coated portion 107 of an optical fiber 106, and a second groove segment 116B dimensioned to receive the core 108 of an optical fiber 106. Accordingly, the first groove segment 116A tapers to the smaller second groove segment 116B. In other embodiments, more than two groove segments are provided (e.g., to accept an outer coating layer, an inner coating layer, and the core). Alternatively, the fiber support feature 112 or features may have only one segment. The fiber support features may be configured as "V" shaped grooves, "U" shaped grooves, or rectangular grooves, for example.

In some embodiments, the module fiber support features 112 terminate at a fiber-end datum surface 114 that is substantially orthogonal to the module fiber support features 112 and extends toward the first surface 119, and are open at the first end 117 of the TIR module 110. In other embodiments, the fiber-end datum surface 114 is slightly angled (e.g., 5 degrees) with respect to a plane that is orthogonal to the module fiber support features 112 for manufacturing purposes (e.g., to prevent the mold from scuffing the fiber-end datum surface 114 when the mold opens during the fabrication process).

As shown in FIG. 3, the optical fibers 106 are disposed within the module fiber support features 112 such that the fiber-ends 109 are positioned at the fiber-end datum surface 114 (i.e., the fiber-ends 109 contact or nearly contact the fiber-end datum surface 114). The stripped portion of exposed core 108 of each optical fiber 106 is positioned in their respective module fiber support feature 112 and contacts (or nearly contacts) the fiber-end datum surface 114 by using an active alignment process. Accordingly, the module fiber support features 112 and the fiber-end datum surface 114 establish location of the fiber-ends 109 of the optical fibers in the X, Y, and Z directions. The tolerances of the TIR module 110 are tightly controlled such that the interface of the module fiber support features 112 and the fiber-end datum surface 114 provides an accurate location for the fiber end 109 of each optical fiber 106. The active alignment process may utilize a microscope or other vision system to assist in fully disposing the optical fibers 106 into the respective module fiber support feature 112 such that the optical fibers 106 are substantially orthogonal to, and the fiber ends 109 are positioned at, the fiber-end datum surface 114. The fiber ends 109 may be substantially in contact with the fiber-end datum surface 114.

Once the location of the fiber ends 109 is verified, the exposed core 108 of the optical fibers 106 may be secured to the module fiber support features 112 of the TIR module 110 by an index-matching adhesive, such as epoxy, thereby index-matching the fiber ends 109 to the fiber-end datum surface 114.

The first surface 119 also includes a recess 115 that is offset from the fiber-end datum surface 114 along the Z-direction. The recess 115 includes a front angled wall 113 that defines a TIR surface 113 as described below, and a rear wall 148 that may be angled or, alternatively, substantially vertical. The angled wall 113 faces the fiber-end datum surface 114 and slopes away from the fiber-end datum surface 114 at an angle θ (see FIGS. 7A and 7B). In an example, the angled wall 113 has a nominal angle θ=45° relative to the Y direction.

The recess 115 and corresponding angled wall 113 provide an air-body interface that allows for the angled wall 113 to serve as a substantially 90° TIR mirror for reflecting optical signals of light as described in detail below (FIG. 4D). The angled wall 113 is referred to hereinafter as TIR surface 113. The material of the TIR body has a refractive index n sufficiently large to provide nominally 90° total-internal reflection at the TIR surface 113. Simply stated, the TIR surface 113 provides an interface between the material of the angled wall 113 and air having different indices of refraction for turning the optical signal within the TIR module 110.

Referring now to FIGS. 4D and 4E, the TIR module 110 may include one or more optional alignment features that are operable to align the TIR module 110 with a corresponding lens module 120. In the illustrated embodiment, the TIR module 110 includes, at the second surface 111, a first alignment feature 141A configured as an alignment pin and a second alignment feature 141B configured as an alignment bore. It should be understood that embodiments are not limited to the number, configuration, and placement of the engagement features depicted in FIGS. 4D and 4E, as many alternatives are possible. As described in more detail below, the alignment features (e.g., first and second alignment features 141A, 141B) are configured to mate with corresponding alignment features of the lens module 120 (e.g., first and second alignment features 143A, 143B shown in FIGS. 5A and 5B) to properly align the TIR module 110 with the lens module 120. The alignment features may be fabricated by injection molding, for example.

Lens Module

Figure 5A:
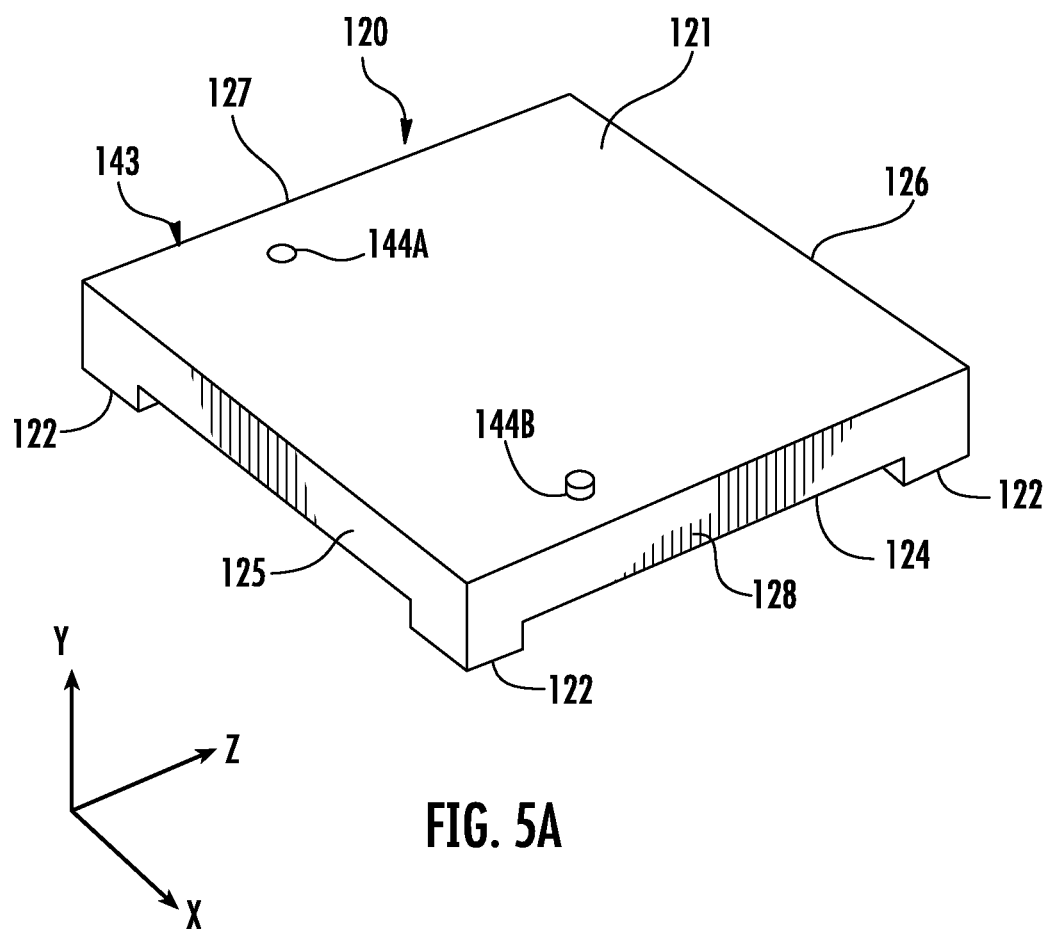
FIG. 5A is a top-down elevated view of a lens module of the fiber optic module assembly depicted in FIGS. 1 through 3.
Figure 5B:
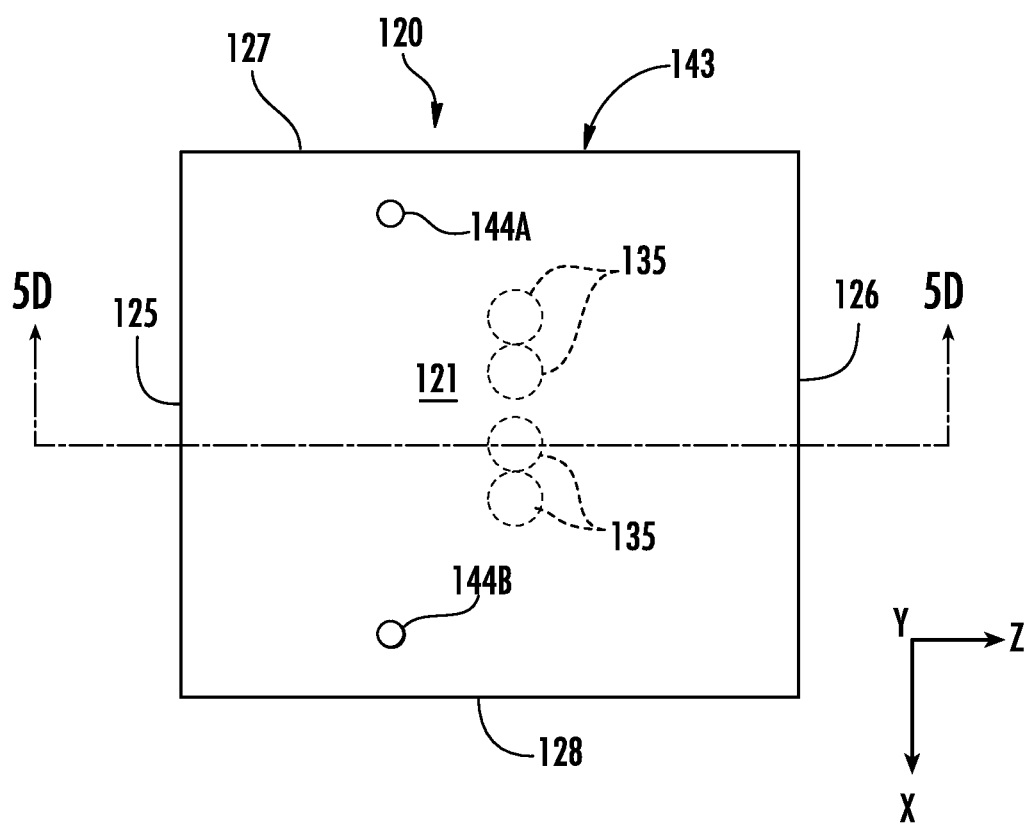
FIG. 5B is a top-down view of the lens module depicted in FIG. 5A.
Figure 5C:
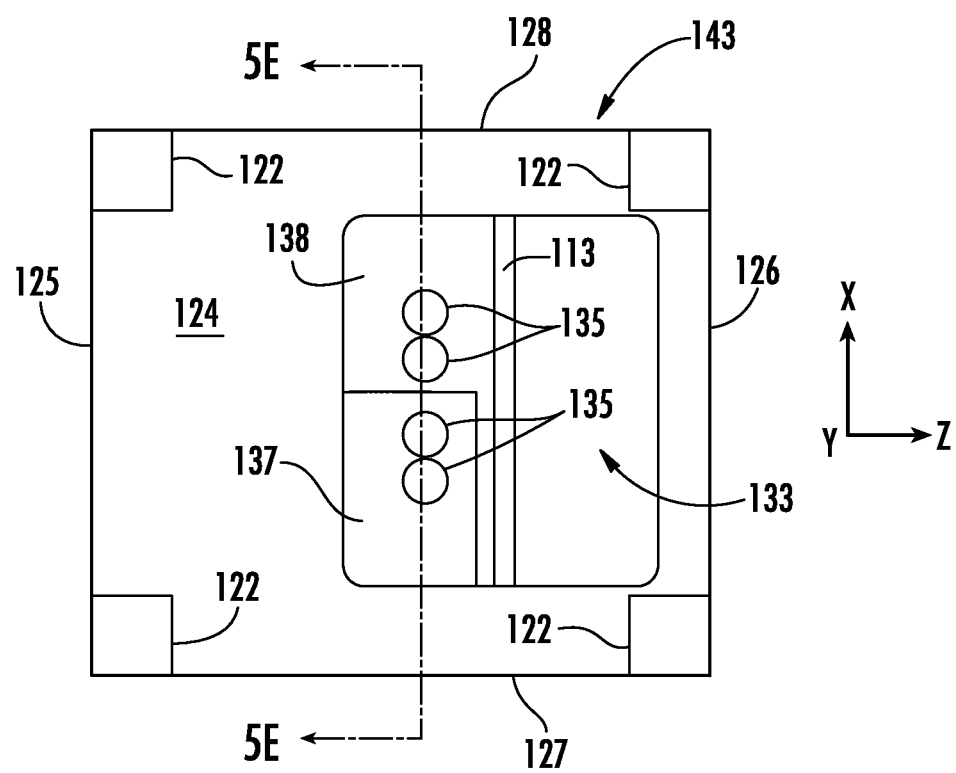
FIG. 5C is a bottom-up view of the lens module depicted in FIGS. 5A through 5B.
Figure 5D:
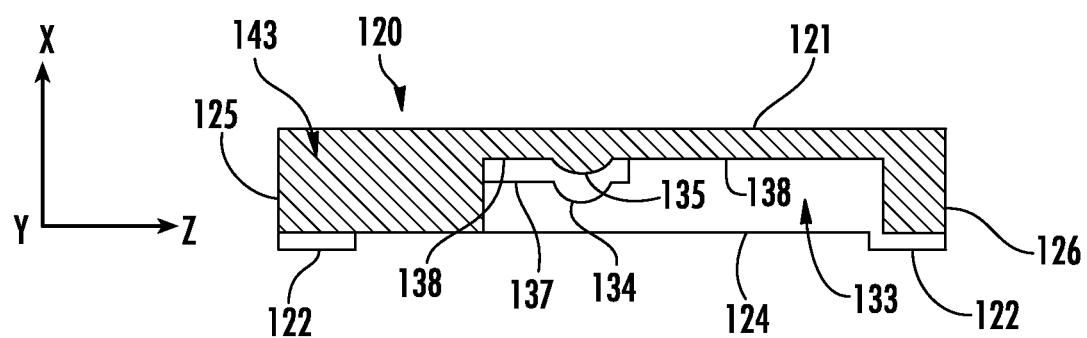
FIG. 5D is a cross-sectional view of the lens module depicted in FIG. 5B taken along line 5B-5B.
Figure 5E:
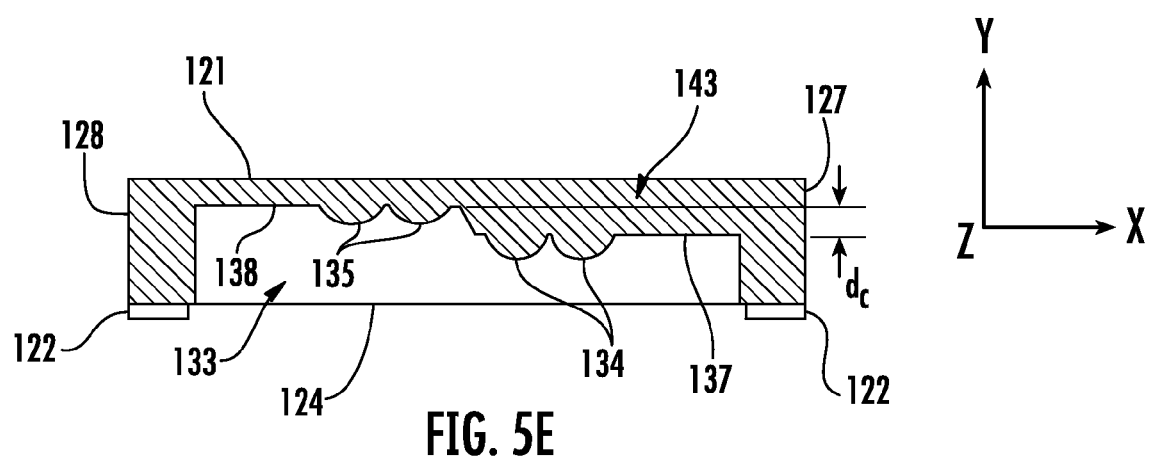
FIG. 5E is a cross-sectional view of the lens module depicted in FIG. 5C taken along line 5C-5C.

The TIR module 110 is coupled to a lens module 120 to provide one or more lenses having a folded optical axis to pass optical signals of light between the optical fibers 106 and the active optical components provided on a PCB. FIGS. 5A-5D depict an exemplary lens module 120 configured to be coupled to the TIR module depicted in FIGS. 4A-4E. FIG. 5A is a top-down elevated view of the lens module 120, while FIG. 5B is a top view of the lens module 120, FIG. 5C is a bottom view of the lens module, and FIG. 5D is a cross-sectional view of the lens module 120 taken along line 5D-5D of FIG. 5C. FIG. 5E is a cross-sectional view of the lens module 120 taken along line 5C-5C.

The lens module 120 generally includes a lens body 143 defining a first surface 121 (e.g., an upper surface), a second surface 124 (e.g., an underside surface) that is opposite from the first surface 121, a first edge 125, a second edge 126 opposite from the first edge 125, a third edge 127, and a fourth edge 128 opposite from the third edge 127. In some embodiments, the lens module 120 may include a plurality of attachment features 122 that extend from the second surface 124 and that may be used to couple the lens module 120 to the PCB 103. For example, the attachment features 122 may be used as fiducials that are aligned and coupled to pads on the surface of the PCB to accurately position the lens module 120 on the PCB and align the lens surfaces 134, 135 (described below) with the active optical components.

As shown in FIG. 5A, the first surface 121 may include one or more alignment features that are configured to mate with the one or more alignment features of the TIR module 110 to precisely align the TIR module 110 with the lens module 120. In the illustrated embodiment, a first alignment feature 144A is depicted as an alignment bore configured to receive the alignment pin 141A of the TIR module 110, and a second alignment feature 144B is configured as an alignment pin that is configured to be inserted into the alignment bore 141B of the TIR module. Accordingly, not only do the alignment features of the TIR module 110 and the lens module 120 of the illustrated embodiment provide alignment functionality, but also keying functionality such that the TIR module 110 and the lens module 120 may only be coupled in a single orientation.

The first surface 121 of the lens module 120 and the second surface 111 of the TIR module may be substantially flat to ensure coupling between the two components with minimal gaps therebetween. In embodiments wherein the first surface 121 and the second surface 111 are not flat, the geometry of each should correspond to one another to minimize air gaps. An index-matching adhesive may be used to bond the first surface 121 of the lens module 120 to the second surface of the TIR module 110 such that optical signals may pass through the interface of the underside surface 111 and the upper surface 121 without substantial loss due to Fresnel reflection. An exemplary UV curing index-matched adhesive may include, but is not limited to, Nextgen UV AB14 manufactured by Nextgen Adhesives. It should be understood that other index-matched adhesives may be used.

Figure 6:
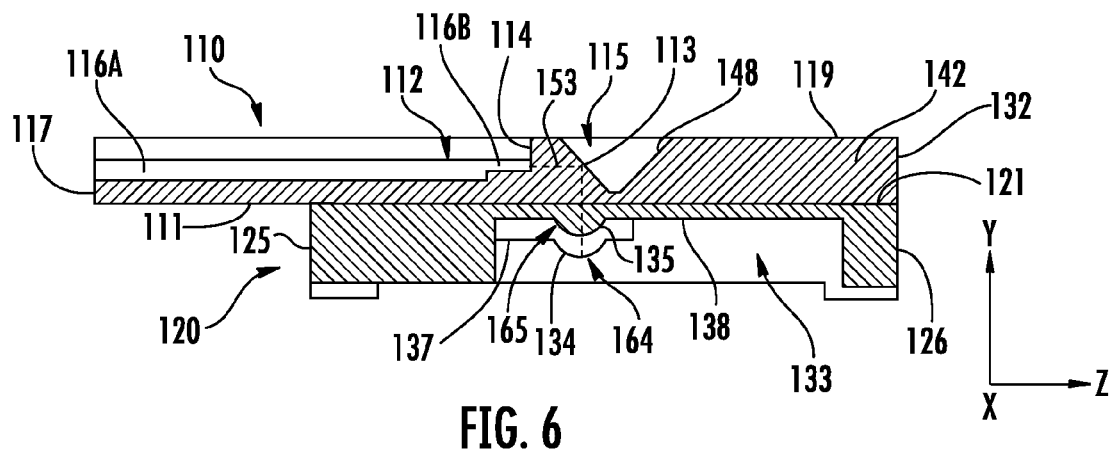
FIG. 6 is a cross-sectional view of an assembled TIR module coupled to a lens module.

FIG. 6 depicts a cross-sectional view of the TIR module 110 coupled to the lens module 120. As described in more detail below, the TIR module 110 and the lens module 120 form lenses 164, 165 having a folded lens axis 153.

As best seen in FIG. 6, as well as FIGS. 5C-5E, the lens body 143 of the lens module 120 defines a recess 133 that is formed in the second surface 124. Active optical components secured to the PCB substrate 103 or intermediate IC chip are disposed within the recess 133 when the lens module 120 is secured to the PCB substrate 103, as described above. In the illustrated embodiment, the recess 133 defines a first ceiling portion 137 and a second ceiling portion 138 that is offset from the first ceiling portion 137 by a distance $d_c$ (FIG. 5E). As described below, the offset distance $d_c$ between the first ceiling portion 137 and the second ceiling portion 138 is provided to accommodate the fact that the optical path for an optical signal received by a photodiode device 140D is different from an optical path for an optical signal emitted by a light source device 140S (see FIGS. 7A and 7B, introduced below).

The first ceiling portion 137 includes one or more lens surfaces 134 configured to focus an optical signal onto a photodetector 140D, while the second ceiling portion 138 includes one or more lens surfaces 135 configured to receive an optical signal from a light source device 140S and focus said optical signal into an optical fiber 106 via the TIR surface 113 provided by the TIR module 110. The lens surfaces 134, 135 define, along with the TIR surface 113 and the fiber-end datum surface 114, corresponding lenses 164 (for focusing optical signals onto a photodiode device 140D), and corresponding lenses 165 (for focusing optical signals into an optical fiber 106), each having a folded lens axis 153. The folded lens axis 153 passes through a lens surface 134, 135 and fiber-end datum surface 114 at substantially right angles thereto. The lens surfaces 134, 135 may be formed by injection molding using a mold fabricated by SPDT, for example. Other fabrication techniques, such as wire EDM, may also be used.

The lens surfaces 134, 135 and the associated folded lens axes 153 are aligned with the corresponding module fiber support features 112 along the Z-direction when the TIR module 110 is coupled to the lens module 120, with one lens surface for each optical fiber support feature, and thus one lens surface for each optical fiber 106 supported therein.

In an example, the portion of folded lens axis 153 that runs in the Z-direction coincides with the optical fiber central axis 151 when the corresponding optical fiber 106 is disposed in the corresponding module fiber support feature 112 and the TIR module 110 is coupled to the lens module 120. Thus, the module fiber support features 112 are configured so that the central axis 151 of the optical fiber and the folded lens axis 153 intersect substantially at right angles and substantially at the TIR surface 113 (best shown in FIG. 6 and FIGS. 7A and 7B). The folded lens axis 153 defines a section of a folded light-source ("source") optical path $OP_S$ or a folded photodetector ("detector") optical path $OP_D$, wherein a portion of each optical path resides within the TIR body 142 and the lens body 143, as discussed below and illustrated in FIGS. 7A and 7B.

The lens surfaces 134, 135, the TIR surface 113, the corresponding portion of the fiber-end datum surface 114 and the corresponding portions of TIR body 142 and the lens body 143 therebetween define lenses 164, 165 having the folded optical axis 153. The lens surfaces 134, 135 can be considered a "front" lens surface and the fiber-end datum surface 114 can be considered a "rear" lens surface. The corresponding portion of the TIR body 142 and the lens body 143 constitutes the lens body. The axial distance between the front and rear lens surfaces is the lens thickness, (i.e., the thickness of the lens body).

In an example, lens surfaces 134 are formed integrally on the first ceiling portion 137 and lens surfaces 135 on the second ceiling portion 138 (i.e., the lens surfaces 134, 135) are integral with lens body 143 and so constitute a curved portion of lens body 143. In another example, the lens surfaces 134, 135 are added to the first and second ceiling portions 137, 138. The lens surfaces 134, 135 each have a diameter or clear aperture CA. In an example, the lens surfaces 134, 135 each have a clear aperture CA of between 250 microns and 600 microns, and in a more specific example about 500 microns, but other suitable sizes are possible.

Figure 7A:
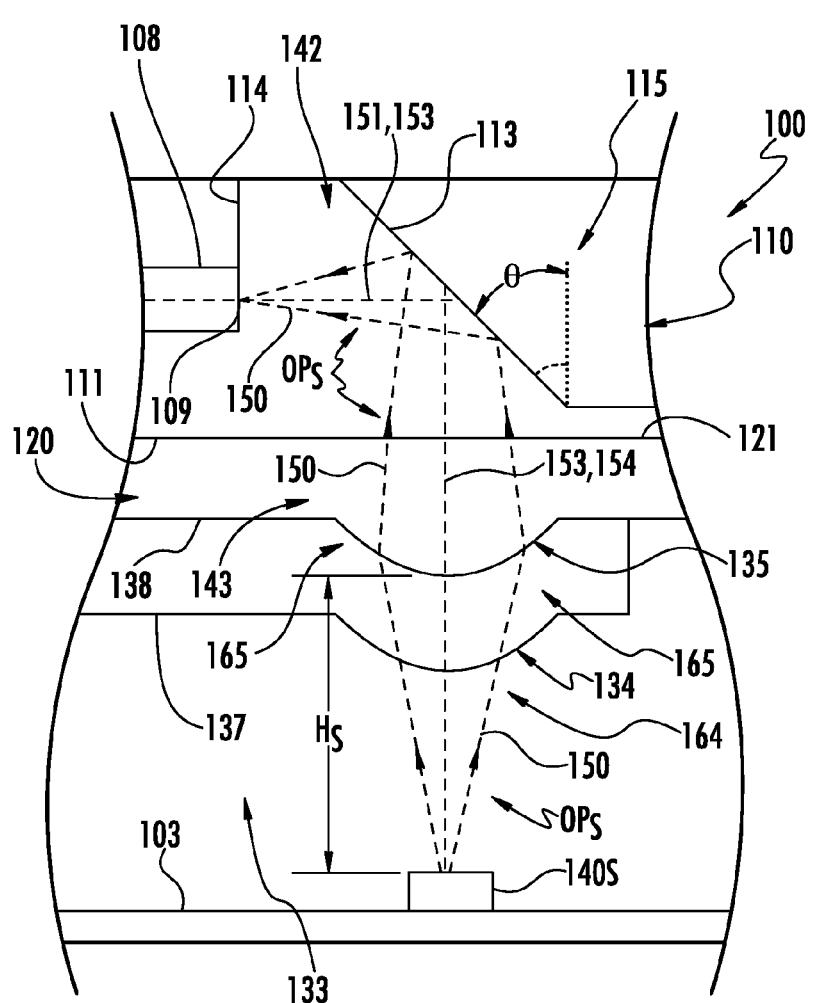
FIG. 7A is a close-up cross-sectional view depicting a printed circuit board ("PCB") substrate (or IC chip) and the active optical component as a light source device, and also depicting the light from the light surface device traveling over a folded source optical path through the lens module and the TIR module to a focus at the optical fiber.
Figure 7B:
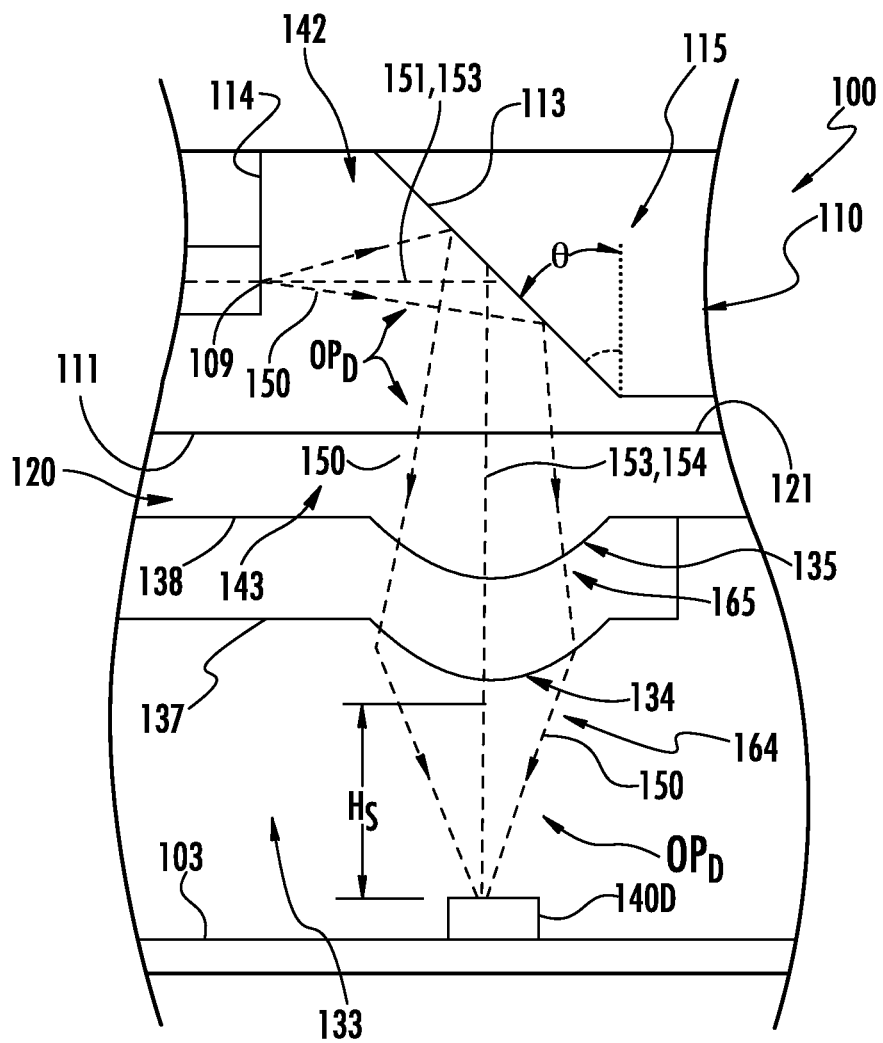
FIG. 7B is a close-up cross-sectional view depicting light traveling in the optical fiber in the opposite direction of FIG. 7A, over a folded detector optical path from the optical fiber and through the TIR module and the lens module to an active optical component in the form of a photodetector supported by the PCB substrate (or IC chip)

It is noted here that while lenses 164, 165 can be the same, the (at least one) source optical path $OP_S$ and the (at least one) detector optical path $OP_D$ are typically not identical. Referring to FIGS. 7A and 7B, this is because light 150 leaving optical fiber end 109 will typically have a different divergence (numerical aperture) than the light source device 140S. Accordingly, the source and detector optical paths $OP_S$ and $OP_D$ are typically not reverse optical paths. In the illustrated embodiment the first ceiling portion 137 and the second ceiling portion 138 are offset with respect to one other to therefore offset lens surfaces 134 and 135 to accommodate the difference in source optical path $OP_S$ and detector optical path $OP_D$. In alternative embodiments, the lens surfaces 134 and 135 may not be offset with respect to one another and the individual lenses configured to accommodate for the difference in source optical path $OP_S$ and detector optical path $OP_D$.

Operation of the Fiber Optic Module Assembly and Active Optical Components

Operation of the fiber optic module assembly 100 including the TIR module 110, the lens module 120, and active optical components will now be described with reference to FIGS. 7A and 7B.

FIG. 7A illustrates active optical component in the form of light source device 140S residing atop the PCB substrate 103 (or an IC chip atop the PCB substrate 103). The TIR module 110 is coupled to the lens module 120 as described above. The light source device 140S has a device axis 154 that is substantially aligned with the lens axis 153 of the at least one lens 165 provided by the lens body 143. In the configuration shown in FIG. 7A, the light source device 140S generates divergent light 150 that travels generally along lens axis 153 toward lens 165 over a source optical path $OP_S$. The divergent light 150 is incident upon convex lens surface 135, which serves to convert the divergent light into convergent light 150, which then travels within the lens body 143 and the TIR body 142 along source optical path $OP_S$. The convergent light 150 is ultimately incident upon the TIR surface 113, which reflects this light by substantially 90° so that the light now travels toward the fiber-end datum surface 114 along source optical path $OP_S$ toward the optical fiber 106. The convergent light 150 travels through the fiber-end datum surface 114 and enters the optical fiber end 109, where this light continues to travel within optical fiber 106. Note that the light 150 may pass through a thin portion of index-matching material (e.g., index-matching epoxy) if such material is disposed between the optical fiber end 109 and the fiber-end datum surface 114, as well as between the TIR module 110 and the lens module 120.

In an example embodiment similar to that shown in FIG. 7A, the lens surface 135 forms substantially collimated light that reflects from the TIR surface 113 at substantially 90° and exits the fiber-end datum surface 114 as substantially collimated light. This embodiment can be used, for example, in certain cases where optical fiber 106 has a gradient-index core 108 and light 150 is introduced into the core 108 as substantially collimated light. Note that such a gradient-index optical fiber will bring light 150 to a focus at some distance from the optical fiber end 109. The lens surface 135 is offset from the light source device 140S by a height $H_S$ such that the light 150 is brought to a focus at a location within the core 108 of the optical fiber 106.

FIG. 7B is similar to FIG. 7A and shows an example where the PCB substrate 103 (or an IC chip) operably supports a photodetector 140D (e.g., a photodiode). The photodetector 140D has a device axis 154 that is substantially aligned with the lens axis 153 of the at least one lens 164. In the configuration shown in FIG. 7B, guided light (emitted from a light source device at an opposite end of the optical cable assembly) exits the optical fiber end 109 as divergent light 150. This divergent light 150 passes through the fiber-end datum surface 114 and into the TIR body of the TIR module 110 as it travels over a detector optical path $OP_D$. Note that the light 150 may pass through a thin portion of index-matching material (e.g., index-matching epoxy) if such material is disposed between the optical fiber end 109 and the fiber-end datum surface 114.

The divergent light 150 is then incident upon the TIR surface 113 and reflects therefrom by substantially 90° to travel along lens axis 153 over the detector optical path $OP_D$. The divergent light 150 continues diverging as it travels within the material of the TIR body 142, across the interface of the TIR body 142 and the lens body 143 (i.e., through second surface 111 of the TIR module 110 and first surface 121 of the lens module 120 by index matching) to the at least one lens surface 134. The lens surface 134 serves to convert divergent light 150 into convergent light 150 as it exits lens body 143 and travels toward photodetector 140D. The lens surface 134 is offset from the photodetector 140D by a height $H_D$ such that the convergent light 150 is generally focused down onto the photodetector 140D. The photodetector 140D then receives this focused light 150 and converts it into an electrical signal (not shown) such as a photocurrent that is directed elsewhere for processing.

Fiber Tray

Figure 8:
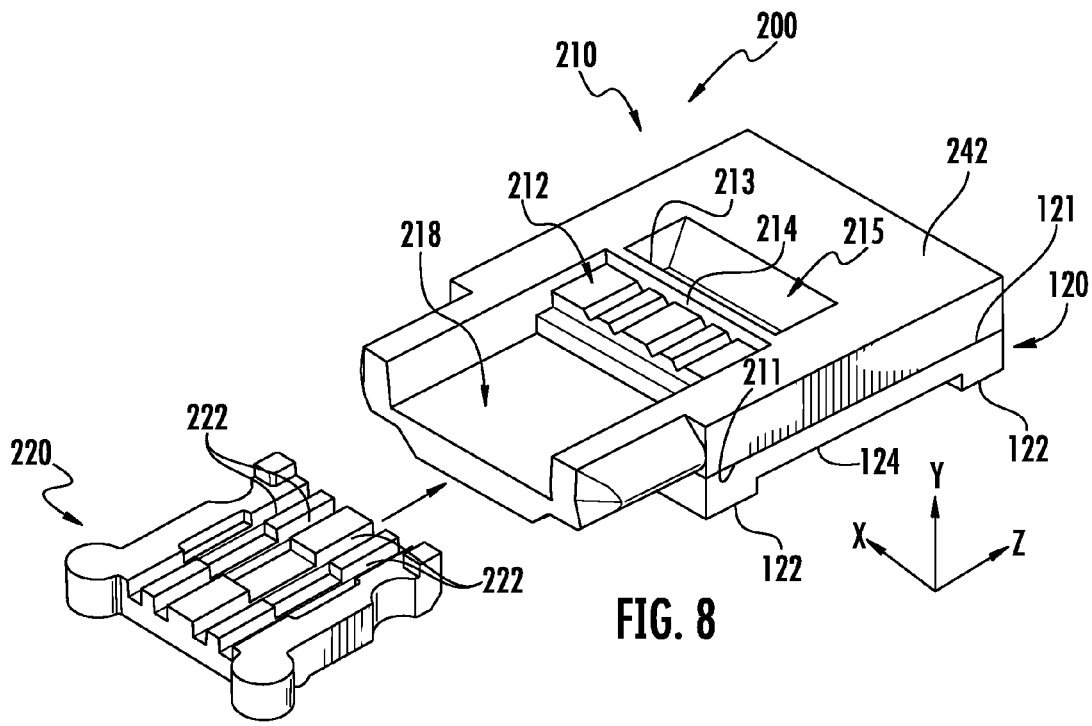
FIG. 8 is a perspective view of a disassembled fiber optic module assembly including a fiber tray.
Figure 9:
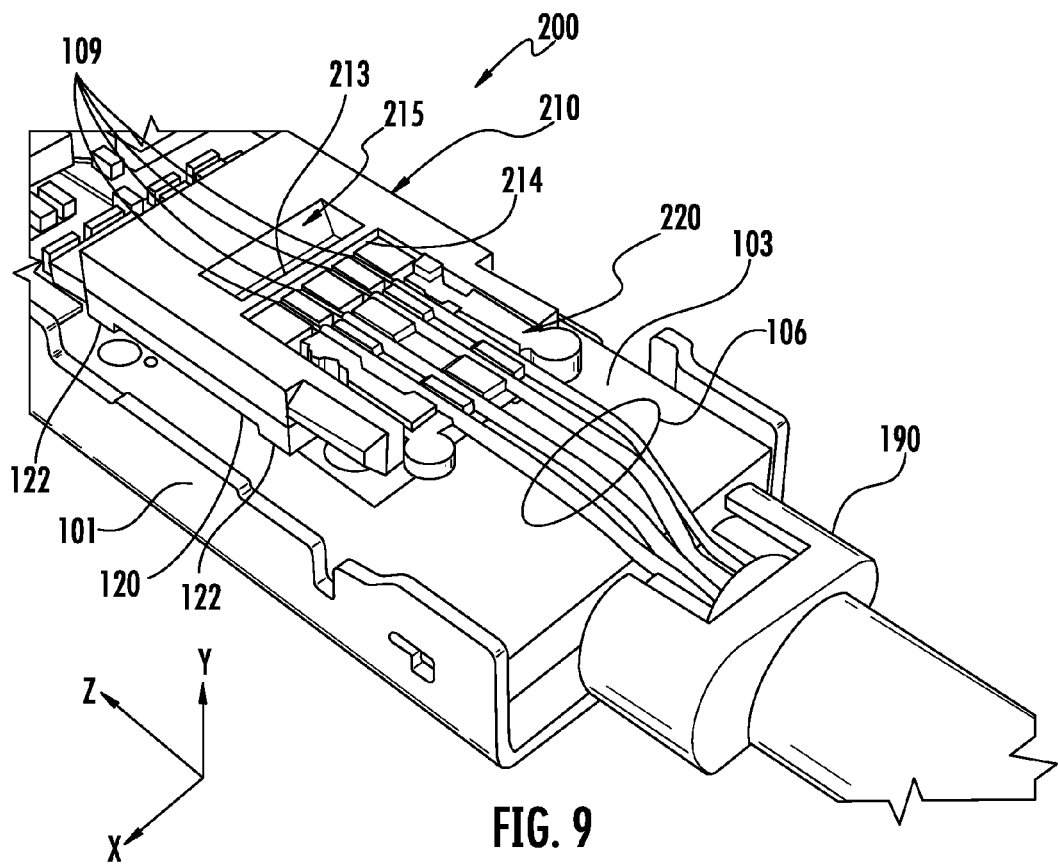
FIG. 9 is a close-up, top-down elevated view of the optical-electrical connector of FIG. 1 showing the fiber optic module assembly of FIG. 8.

Referring now to FIGS. 8 and 9, a fiber optic module assembly 200 may also include a fiber tray 220 that is configured to be populated with optical fibers 106 and disposed in the TIR module 210, which is coupled to a lens module 120 as described above. FIG. 8 is a perspective view of a fiber optic module assembly 200 in a partially disassembled state (the TIR module 210 is shown coupled to the lens module 120), and FIG. 9 is a perspective view of an assembled fiber optic module assembly 200 coupled to a PCB substrate 103 of the optical-electrical connector 10 depicted in FIG. 1.

Optical fibers 106 may be first inserted into fiber support features 222 (e.g., grooves) of the fiber tray 220 and then further processed (e.g., laser stripping one or more coating layers to expose the optical fiber core or cladding). The fiber tray 220 may then be positioned in the TIR module 210 and secured by an adhesive. The fiber ends 109 of the optical fibers 106 extending from the fiber tray 220 may be actively positioned within the module fiber support features 212 (e.g., grooves) of the TIR module 210 (e.g., by use of a microscope or other vision system) and secured to the TIR module 210 at the module fiber support features 212 with an index-matching adhesive. The fiber ends 109 are actively aligned and positioned such that they are positioned at (i.e., contact or nearly contact) a reference fiber-end datum surface 214 such that they are aligned with a plurality of lenses defined by the TIR module 210 and the lens module 120. The TIR module 210 may be coupled to the lens module 120 before or after insertion of the fiber tray 220 into the TIR module 210.

Use of the fiber tray 220 enables simultaneous processing of multiple optical fibers 106 prior to insertion into the TIR module 210, which may reduce fabrication time and cost. Further, the fiber tray 220 secures the loose optical fibers 106 at a location close to the fiber ends 109 such that the positioning of the stripped portion 108 of the optical fibers 106 in the module fiber support features 212 of the TIR module 210 by an active alignment process is more manageable.

As stated above, the fiber tray 220 is configured to be disposed and secured into a fiber tray recess 218 of the TIR module 210 such that fiber ends 109 of the optical fibers 106 that extend from an optional strain relief element 190 are positioned at a fiber-end datum surface 214. The fiber ends 109 of the optical fibers 106 should contact the fiber-end datum surface 214. However, due to variations in fiber length, some of the fiber-ends may nearly contact the fiber-end datum surface 214. The optical fibers 106 are supported by fiber support features 222 in a top surface of the fiber tray 220. As described in detail below, the TIR module 210 includes an angled surface of a recess 215 that acts as a TIR surface 213 to reflect optical signals passing through an intermediate portion of the TIR module 210 and the lens module 120 extending from the fiber-end datum surface 214 and optical signals emitted by active optical components (not shown) positioned on the PCB substrate 103 beneath the lens module 120, as described above. The fiber tray 220 is secured to the TIR module 210 within the fiber tray recess 218 by an adhesive. The optical fibers 106 may be secured to the TIR module 210 by an index-matching adhesive after actively positioning the fiber ends 109 such that they are optically aligned with lenses defined by the TIR module 210. In embodiments, the fiber ends 109 may be aligned with a datum that acts as a surrogate for the position of the lenses. It is noted that the lens module 120 may be coupled to a surface of the PCB as described above.

Figure 10A:
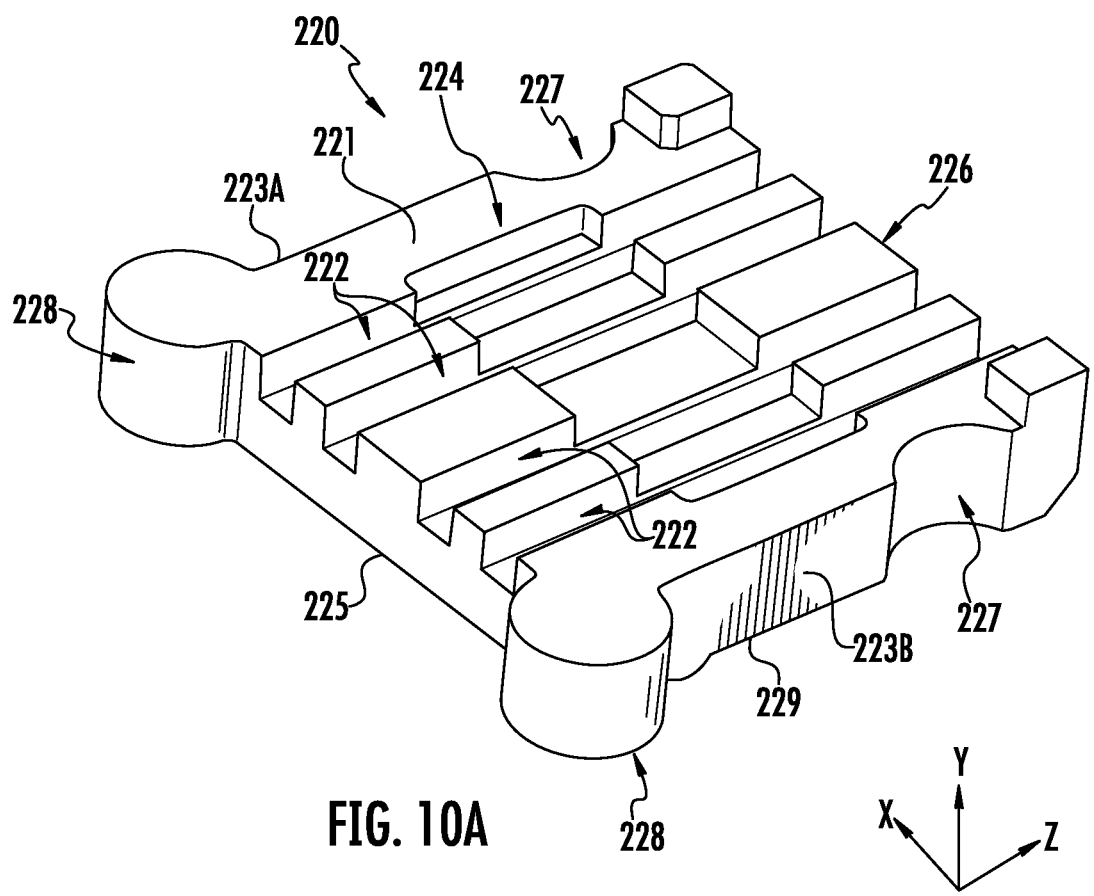
FIG. 10A is a top-down elevated view of a fiber tray of the fiber optic module assembly depicted in FIGS. 8 and 9.
Figure 10B:
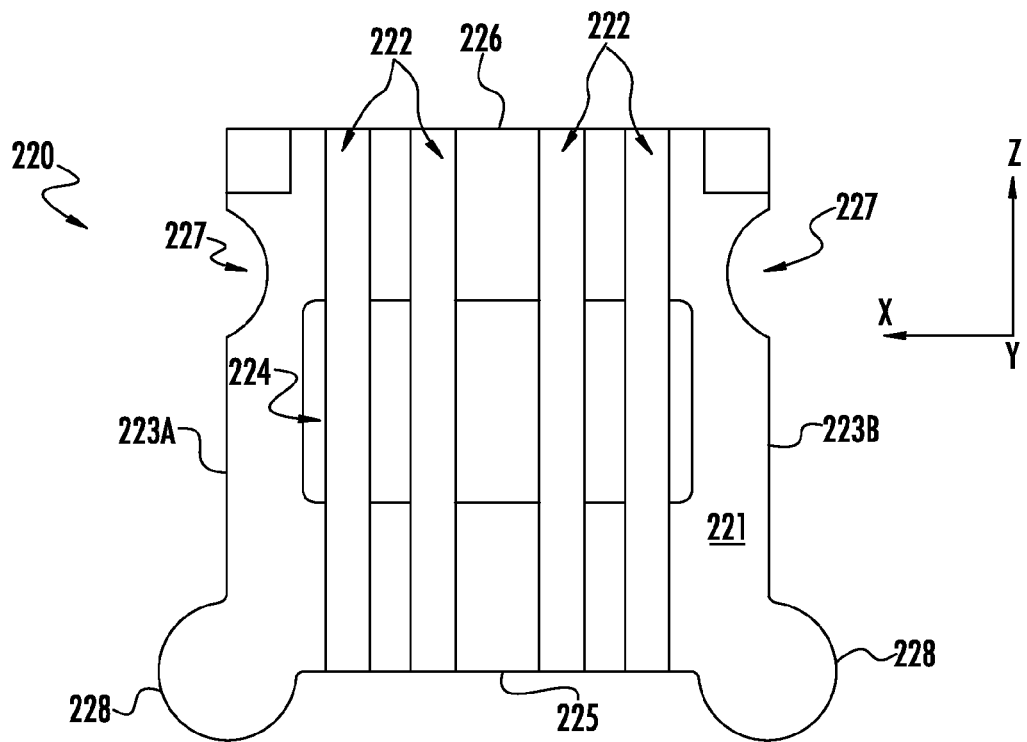
FIG. 10B is a top-down view of the fiber tray depicted in FIG. 10A.
Figure 10C:
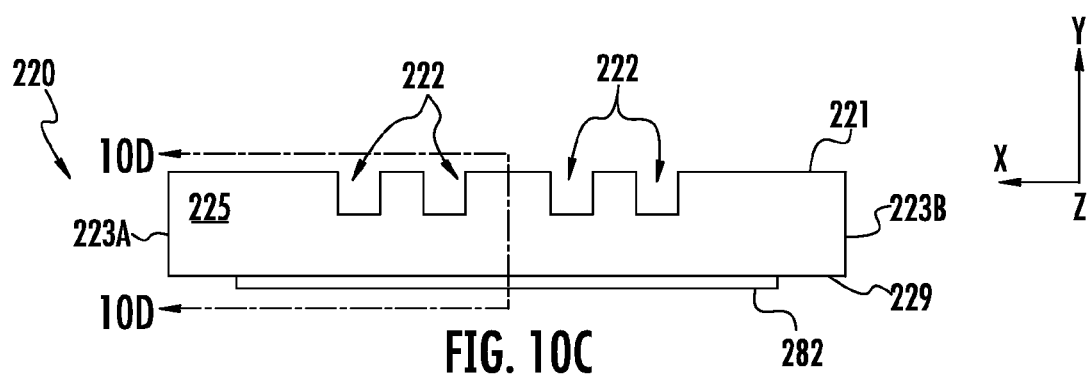
FIG. 10C is a rear view of the fiber tray depicted in FIGS. 10A and 10B.
Figure 10D:
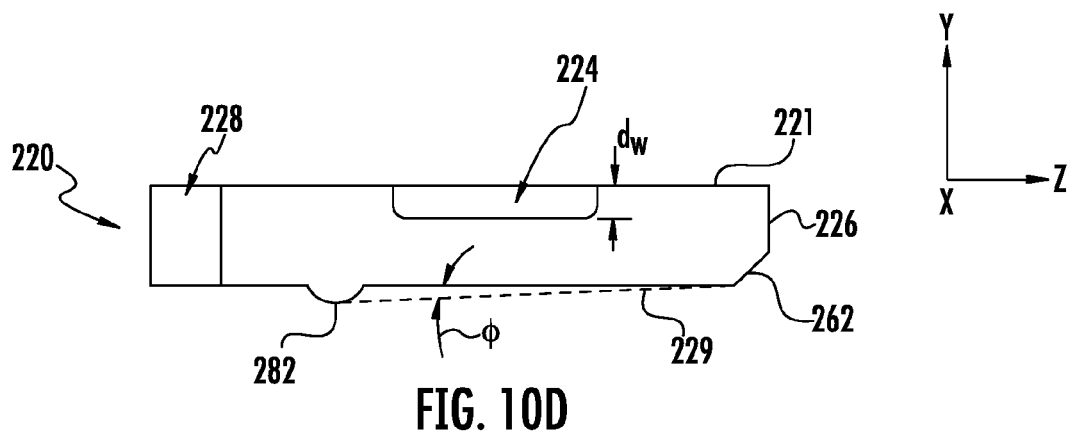
FIG. 10D is a cross-sectional view of the fiber tray depicted in FIG. 10C taken along line 10D-10D.

Referring now to FIGS. 10A-10D, an exemplary fiber tray 220 is described in detail. FIG. 10A is a top-down elevated view of the exemplary fiber tray 220, while FIG. 10B is a top view of the fiber tray 220, FIG. 10C is a rear view of the fiber tray 220, and FIG. 10D is a cross-sectional view of the fiber tray taken along line 10D-10D in FIG. 10C.

The fiber tray 220 is configured to maintain a plurality of optical fibers 106 prior to insertion into the TIR module 210 and, in some embodiments, prior to processing of the optical fibers 106, such as laser stripping to expose the core of each optical fiber. The fiber tray 220 may be made of any suitable material, such as molded thermoplastic, for example. Exemplary materials include, but are not limited to, Lexan 940A fabricated by the SABIC innovative Plastics and Udel 3700HC manufactured by Solvay Specialty Polymers. The material chosen should transmit ultra-violet ("UV") wavelengths such that UV-cured adhesives may be cured below the fiber tray 220. In embodiments, the features of the fiber tray 220, such as the open groove fiber support features 222, may be formed by injection molding using a mold by wire EDM, for example.

The fiber tray 220 depicted in FIGS. 10A-10D generally includes a first surface 221, a second surface 229 opposite from the first surface 221, a first edge 225 defining a rear portion of the fiber tray 220 (i.e., insertion edge), a second edge 226 opposite from the first edge 225, a third edge 223A, and a fourth edge 223B opposite from the third edge 223A. The second edge 226 may optionally include a chamfer 262 for engaging the TIR module 210.

A plurality of fiber support features configured as grooves 222 extend from the first edge 225 to the second edge 226 on the first surface 221 of the fiber tray 220. The grooves 222 are configured to receive the coated portion 107 of the plurality of optical fibers 106, as shown in FIGS. 11A and 11B. Although the grooves 222 are illustrated as rectangular grooves in FIGS. 10A-10C, embodiments are not limited thereto. For example, the grooves 222 may be configured as "V" shaped grooves (i.e., shaped as the letter "V" when viewed in cross section) or "U" shaped grooves (i.e., shaped as the letter "U" when viewed in cross section). The optical fibers 106 may be configured as described above.

As shown in FIG. 11A, the optical fibers 106 are disposed within the grooves 222 such that they extend beyond the second edge 226. Each optical fiber 106 is stripped to expose the core 108 (or cladding), and then cleaved substantially perpendicular to the fiber axis such that each optical fiber 106 extends beyond the second edge 226 of the fiber tray 220 by a length $L_f$. As an example and not a limitation, the optical fibers 106 may be stripped of the coating 107 by a laser stripping process wherein a laser is utilized to remove the coating material. As an example and not a limitation, a laser source may be used to remove the coating 107, such as the laser stripping process offered by OpTek Systems of Abingdon, UK, for example. Other laser stripping methods may also be utilized. Additionally, non-laser stripping methods may be used to strip the coating material, such as chemical, mechanical or hot gas stripping. The stripped optical fiber 106 may be cleaved by laser cleaving or mechanical cleaving, for example. In some embodiments, the optical fibers 106 are not cleaved after being disposed in the fiber tray 220. An exemplary laser cleaving system includes, but is not limited to, laser cleaving systems offered by OpTek Systems of Abingdon, UK.

A stripped portion of a length $L_c$ of each optical fiber 106 is measured from the end of the coating 107 to a fiber end 109. The length $L_f$ after cleaving should be such that the fiber ends 109 of the optical fibers reach the fiber-end datum surface 214, as described in detail below. The length $L_c$ should be equal to or greater than a length of module fiber support features 212 of the TIR module 210 (see FIG. 12A). In embodiments, the optical fibers 106 may be stripped of the coating 107 by a stripping process after being secured to the fiber tray 220 such that multiple optical fibers may be processed simultaneously.

Referring generally to FIGS. 10A-10D, and 11A, the illustrated fiber tray 220 further includes an adhesive well 224 extending a depth $d_w$ into a bulk of the fiber tray 220 from the first surface 221. The adhesive well 224 may be provided to receive an adhesive, such as a curable epoxy, for example, to secure the optical fibers 106 within the grooves 222 of the fiber tray 220. Accordingly, the adhesive well 224 is configured as a repository for adhesive. Adhesive applied to the adhesive well 224 may wick along the grooves 222 and the coatings 107 of the optical fibers 106. An exemplary UV curing index matched adhesive may include, but is not limited to, Nextgen UV AB14 manufactured by Nextgen Adhesives. Other UV curing index matched adhesives may be used. Although the adhesive well 224 is depicted as being centrally disposed within the first surface 221 of the fiber tray 220, embodiments are not limited thereto. Additionally, the adhesive well 224 may also be configured as more than one well within the first surface 221 of the fiber tray 220 in other embodiments.

Figure 12A:
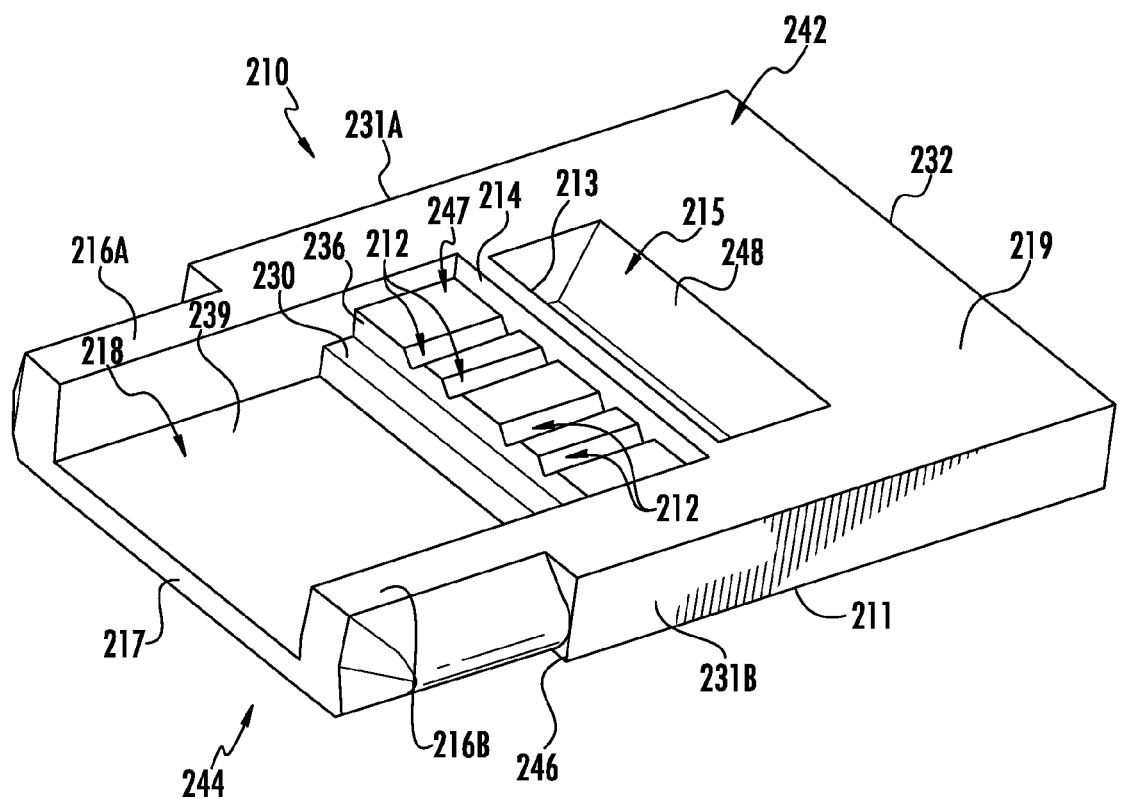
FIG. 12A is a top-down elevation view of a TIR module of the fiber optic module assembly depicted in FIGS. 8 and 9.

The fiber tray 220 may also include adhesive receiving features 227 for securing the fiber tray 220 to the fiber tray recess 218 of the TIR module 210 (see FIG. 12A). The adhesive receiving features 227, which in the illustrated embodiment are configured at circular notches located on the third and fourth edges 223A, 223B of the fiber tray, provide receptacles to receive an adhesive (e.g., a curable index-matching epoxy matching the fiber end 109 to the material of the TIR module 210). The adhesive receiving features 227 allow for the adhesive to wick under the fiber tray 220 such that the fiber tray 220 may be bonded to a floor 239 of the fiber tray recess 218. It should be understood that more than two adhesive receiving features 227 (i.e., additional adhesive receiving features) may be provided, and at locations other than those depicted in the figures are possible. In alternative embodiments, the adhesive receiving features may be configured as through-holes extending from the first surface 221 to the second surface 229 of the fiber tray 220, thereby allowing adhesive to flow between the fiber tray 220 and the fiber tray recess 218 of the TIR module 210.

Referring to FIG. 10D (as well as to FIGS. 10C and 11B) the fiber tray 220 may optionally include one or more tilting protrusions 282 extending from the second surface 229 near the first edge 225 to tilt the fiber tray 220 downward by a tilt angle φ toward the second edge 226 and the interface between module fiber support features 212 and fiber-end datum surface 214 of the TIR module 210 when the fiber tray 220 is positioned in the fiber tray recess 218. The title angle φ should be such that the optical fibers 106 extending beyond the second edge 226 of the fiber tray 220 are encouraged to be disposed within the module fiber support features 212 of the TIR module 210, and therefore be pre-aligned with the lens surfaces 134, 135 of the lens module 120. In other embodiments, no tilting protrusions are provided such that the entire second surface 229 (i.e., bottom surface) of the fiber tray 220 contacts the floor 239 of the fiber tray recess 218 of the TIR module 210.

In some embodiments, the fiber tray 220 may also include optional handling features 228 to ease the handling (by human or a machine) of the fiber tray 220, such as when inserting the fiber tray 220 into the fiber tray recess 218 and aligning the fiber ends 109 of the optical fibers into the module fiber support features 212.

TIR Module for Mating with Fiber Tray

Figure 12B:
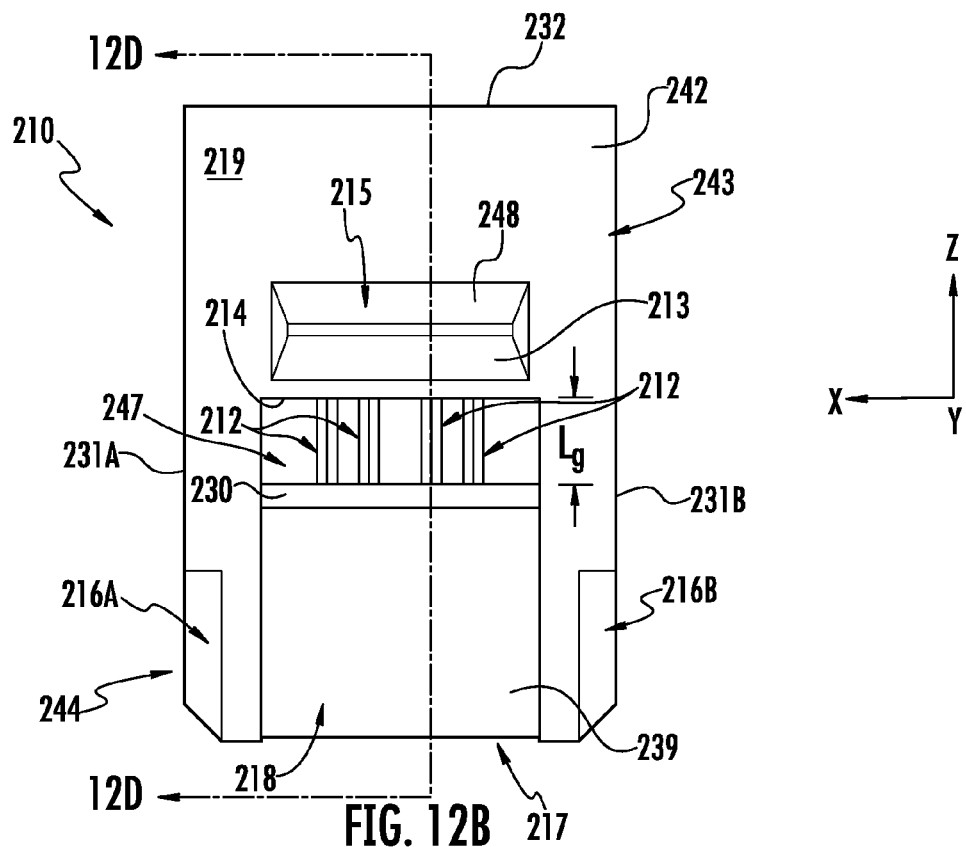
FIG. 12B is a top view of the TIR module depicted in FIG. 12A.
Figure 12C:
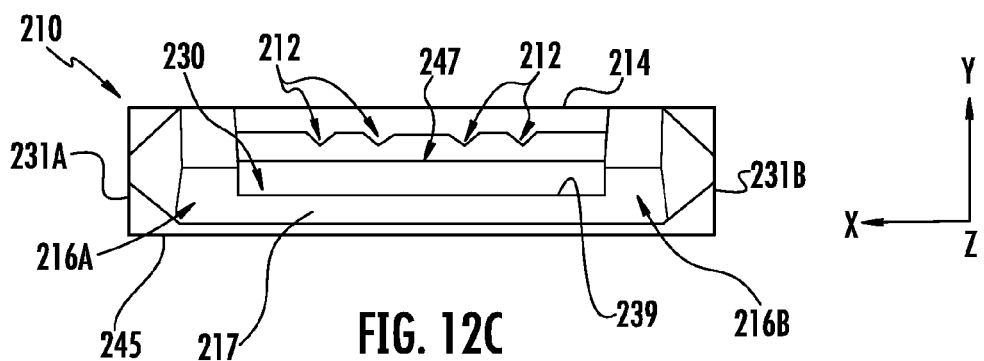
FIG. 12C is a rear view of TIR module depicted in FIGS. 12A and 12B.
Figure 12D:
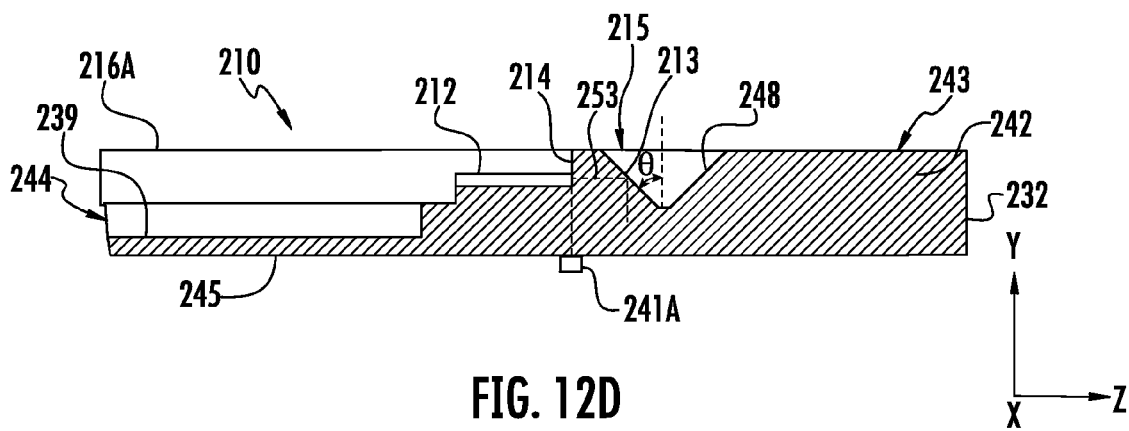
FIG. 12D is a cross-sectional view of the TIR module depicted in FIG. 12B taken along line 12D-12D.

Referring to FIGS. 12A-12D, an exemplary TIR module 210 configured to be coupled to the lens module 120 described above and to receive the fiber tray 220 depicted in FIGS. 10A-11B is illustrated. FIG. 12A is a top-down elevated view of an exemplary TIR module 210, while FIG. 12B is a top view of the TIR module 210, FIG. 12C is a rear view of the TIR module 210, and FIG. 12D is a cross-sectional view of the TIR module 210 taken along line 12D-12D of FIG. 12B.

Generally, the TIR module 210, in cooperation with the lens module 120, is configured to redirect optical signals of light emitted from the fiber ends 109 of the optical fibers 106 onto a photodetector 140D (see FIG. 7B), and redirect and focus optical signals of light emitted by light source devices 140S into the optical fibers 106 (see FIG. 7A). The TIR module 210 has a body 242 that, in the illustrated embodiment, defines a rectangular parallelepiped shape TIR portion 243 and a fiber tray insertion portion 244 extending from a front surface 246 of the TIR portion 243.

The body 242 of the TIR module 210 is made of a material that is transmissive to light having a predetermined wavelength $\lambda$ according to the particular optical communication protocol, as described above. The body 242 has a front end 217 at the insertion portion 244, a front surface 246 of the TIR portion 243, a rear end 232 substantially parallel to the front surface 246, a first surface 219, and a second surface 245 substantially parallel to the first surface 219. The TIR portion 243 of the body 242 also includes two substantially parallel sides 231A, 231B. The example insertion portion 244 includes two arms 216A, 216B and a floor 239 that define the fiber tray recess 218 into which the fiber tray 220 is disposed. In alternative embodiments, the body 242 does not include an insertion portion 244 as depicted in FIGS. 12A-12D, but rather the body 242 is configured as a unitary, rectangular parallelepiped shape (e.g., the front face 246 is located at the front end 217).

The fiber tray recess 218 extends into the TIR portion 243 and, in the illustrated embodiment, the floor 239 of the fiber tray recess 218 terminates at a ledge 230 that may be configured to engage the chamfer 262 of the fiber tray 220 when the fiber tray 220 is disposed in the fiber tray recess 218. The ledge 230 transitions into a fiber support ledge 247 having a height that is greater than a height of the ledge 230. The fiber support ledge 247 defines a wall 236. Alternatively, the floor 239 may terminate directly at the fiber support ledge 247 rather than the intermediate ledge 230.

The fiber support ledge 247 includes module fiber support features 212 configured as "V" shaped grooves in the illustrated embodiment. The module fiber support features 212 may be configured as rectangular grooves, or "U" shaped grooves, for example. Alternatively, the module fiber support features 212 may also be configured as bores dimensioned to receive the stripped portion of the optical fibers 106. The module fiber support features 212 run in the Z-direction at a length $L_g$, and are generally parallel to first and second sides 231A, 231B. In some embodiments, the module fiber support features 212 terminate at a fiber-end datum surface 214 that is substantially orthogonal to the module fiber support features 212 and extends toward the first surface 219, and are open at an opposite end of the fiber support ledge 247. In other embodiments, the fiber-end datum surface 214 is slightly angled (e.g., 5 degrees) with respect to a plane that is orthogonal to the module fiber support features 212 for manufacturing purposes (e.g., to prevent the mold from scuffing the fiber-end datum surface 214 when the mold opens during the fabrication process). The module fiber support features 212 are configured to be aligned with the support features 222 of the fiber tray 220 when the fiber tray 220 is disposed in the fiber tray recess 218. Further, each module fiber support feature 212 is aligned with a lens axis of each lens to properly locate the fiber axis of the optical fibers 106 with the corresponding lens axis of the lenses when the TIR module 210 is coupled to the lens module 120.

The first surface 219 also includes a recess 215 that is offset from the fiber-end datum surface 214. The recess 215 includes a front angled wall 213 that defines a TIR surface 213 as described below, and a rear wall 248 that may be angled or, alternatively, substantially vertical. The angled wall 213 faces the fiber-end datum surface 214 and slopes away from the fiber-end datum surface 214 at an angle $\theta$ (see FIG. 12D). In an example, the angled wall 213 has a nominal angle $\theta=45°$ relative to the Y-direction.

The fiber-end datum surface 214 accordingly acts as a mechanical stop for the fiber ends 109 of the optical fibers 106 that establishes the longitudinal position (i.e., the Z-directional position) of optical fibers 106 supported by the module fiber support features 212.

The recess 215 and corresponding angled wall 213 provide an air-body interface that allows for the angled wall 213 to serve as a substantially 90° TIR mirror for reflecting optical signals of light as described in detail below. The angled wall 213 is referred to hereinafter as TIR surface 213. The material of the body 242 has a refractive index n sufficiently large to provide nominally 90° total-internal reflection at the TIR surface 213. Simply stated, the TIR surface 213 provides an interface between the material of the angled wall 213 and air having different indices of refraction for turning the optical signal within the TIR module 210.

As described above with respect to the TIR module 110 depicted in FIGS. 4D and 4E, the TIR module 210 of the present fiber optic module assembly 200 may include one or more optional alignment features that are operable to align the TIR module 210 with a corresponding lens module 120. Referring to FIG. 12D, the TIR module 210 includes, at the second surface 245, a first alignment feature 141A configured as an alignment pin and a second alignment feature (not shown) configured as an alignment bore. The alignment features of the TIR module 210 are configured to mate with corresponding alignment features of the lens module 120. The TIR module 210, when coupled to a lens module 120, may form a plurality of lenses 164, 165 as described above with respect to FIGS. 6, 7A and 7B.

Figure 13:
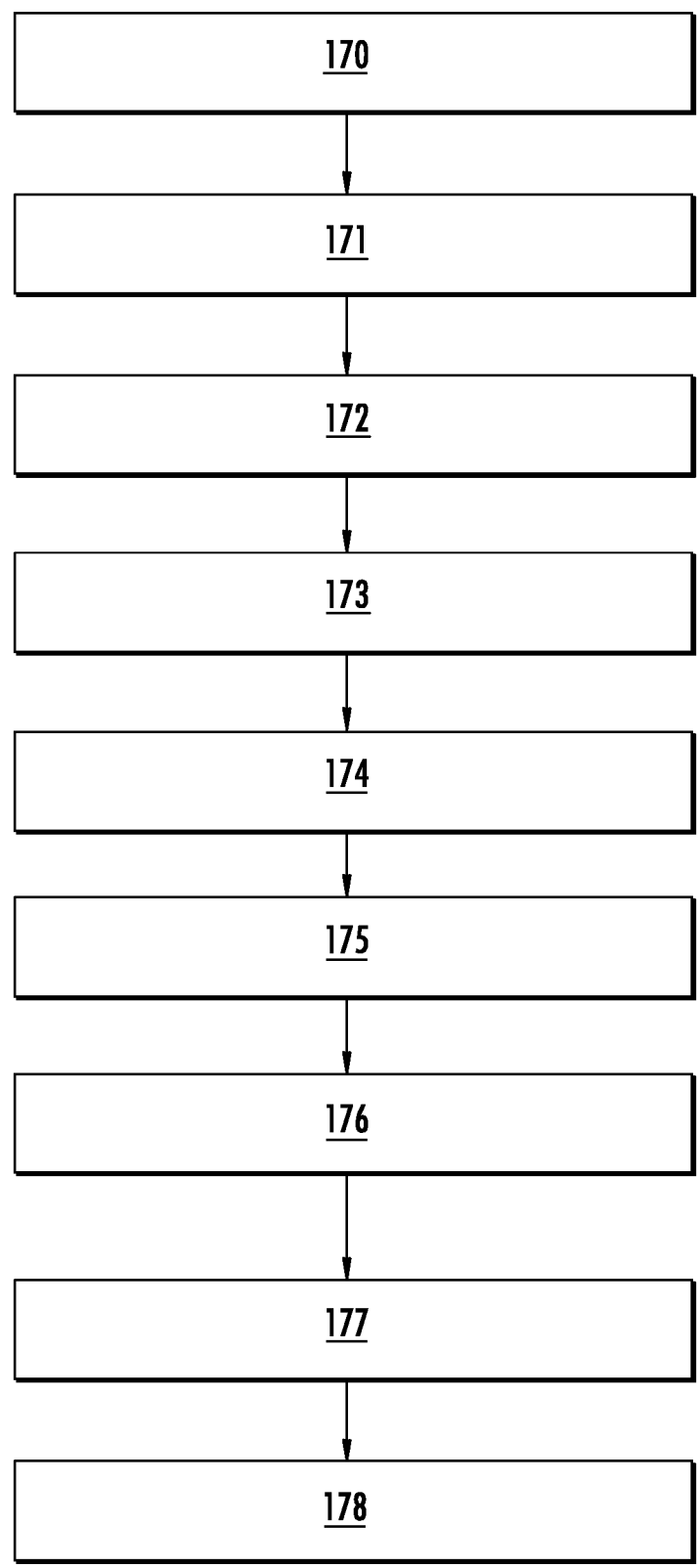
FIG. 13 is a flowchart describing an example optical fiber processing method according to one or more embodiments of the disclosure.

Processing Optical Fibers and Installation of the Fiber Tray and Optical Fibers into the TIR Module Referring now to FIG. 13, a flowchart of an example method of processing optical fibers 106 is provided. At block 170, a plurality of optical fibers 106 are inserted into the grooves 222 within a first surface 221 of a fiber tray 220, as shown in FIGS. 11A and 11B. The fiber ends 109 of the optical fibers extend beyond the second edge 226 by an offset length that is equal to or greater than a length $L_g$ of the module fiber support features 212 on the TIR module 210. As an example and not a limitation, a fixture or automation device may be utilized to accurately position the plurality of optical fibers 106 in the fiber tray 220. At block 171, the length $L_f$ of the portion of the optical fibers 106 that extend beyond the second edge 226 may be verified (e.g., by an appropriate measurement system) in embodiments wherein the optical fibers 106 are not cleaved to the desired length $L_f$.

After the optical fibers 106 are properly positioned within the fiber tray 220, an adhesive, such as a curable epoxy, for example, is applied to the adhesive well 224. The adhesive flows throughout the adhesive well 224 and into the grooves 222. Thus, the adhesive secures the optical fibers 106 to the fiber tray 220 (block 172).

Securing the plurality of optical fibers 106 to the fiber tray 220 in such a manner allows for multiple optical fibers 106 to be stripped of their coating layers 107 simultaneously because they are not loose (i.e., they are manageable and maintained in a known, desired arrangement). At block 173, the coating 107 of each optical fiber 106 is removed by a laser stripping process to expose the core 108 (or cladding), thereby forming a stripped portion having a length $L_e$ that is equal to or greater than the length $L_g$ of the module fiber support features 212 on the TIR module 210. Additionally, in some embodiments, the optical fibers 106 are cleaved such that they extend beyond a second edge 226 of the fiber tray 220 by a length $L_f$ (block 174). Any stripping system may be utilized to remove the coating 107 and any other layers of the optical fibers 106 that surround the core 108. Further, any cleaving method may be used to cleave the optical fibers 106 to the proper length. As an example and not a limitation, an exemplary laser stripping process and laser cleaving process includes the optical fiber laser stripping and cleaving systems offered by OpTek Systems of Abingdon, UK. It is noted that stripping processes other than laser stripping processes may be used to remove the coating 107, such as chemical, mechanical or hot gas stripping. Additionally, mechanical cleaving methods may be used to cleave the optical fibers 106 rather than laser cleaving in some embodiments.

At block 175, the fiber tray 220, along with the stripped optical fibers 106, is positioned within the fiber tray recess 218 of the TIR module 210. It is noted that the TIR module 210 may or may not be coupled to the lens module 120 when the fiber tray 220 is inserted into the fiber tray recess 218. The fiber tray recess 218 is dimensioned to accommodate the fiber tray 220. In the illustrated embodiment, the fiber tray 220 is inserted into the fiber tray recess 218 in the Z-direction. As an example and not a limitation, a vacuum micro-manipulator may be coupled to handling features 228 of the fiber tray 220 to position the fiber tray 220 in the fiber tray recess 218.

At block 176, the stripped portion of exposed core 108 of each optical fiber 106 is positioned in their respective fiber support feature 222 and contacts (or nearly contacts) the fiber-end datum surface 214 by using an active alignment process. The tolerances of the TIR module 210 are tightly controlled that the interface of the fiber support features 222 and the fiber-end datum surface 214 provides an accurate location for the fiber end 109 of each optical fiber 106 such that the central axis 151 of each core 108 is substantially aligned with the folded lens axis 153 of the corresponding lens provided by the TIR module 210 and the lens module 120. The active alignment process may utilize a microscope to assist in fully disposing the optical fibers 106 into the respective fiber support feature 222 such that the optical fibers 106 are substantially orthogonal to, and the fiber ends 109 are positioned at, the fiber-end datum surface 214. The fiber ends 109 may be substantially in contact with the fiber-end datum surface 214. In some embodiments, an X-Y-Z indexing machine (not shown) may be utilized to assist in properly locating the fiber tray 220 in the fiber tray recess 218 such that the fiber ends 109 are in the correct positions. For example, the X-Y-Z indexing machine may allow incremental movements of the fiber tray 220 and/or the TIR module 210 in the X, Y, and Z-directions for proper alignment.

At block 177 the location of the fiber ends 109 of the optical fibers 106 in the fiber support features 222 is verified. For example, the location of the fiber ends 109 may be verified visually using a microscope. Alternatively, the location of the fiber ends 109 may be actively verified by sending and receiving optical signals through the lenses defined by TIR module 210, and confirming receipt of such optical signals.

Once the location of the fiber ends 109 is verified, the fiber tray 220 and exposed core 108 of the optical fibers 106 are secured to the TIR module 210 by an index-matching adhesive, such as epoxy (block 178). The index-matching adhesive substantially matches the index of refraction of the material of the TIR module body 242 and the core 108 of the optical fibers 106, and may fill in any gaps that exist between the fiber ends 109 of the optical fibers 106 and the fiber-end datum surface 214. The fiber tray 220 may be secured to the fiber tray recess 218 portion of the TIR module 210 by applying the index-matching adhesive to the adhesive receiving features 227, which, along with the inner surface of the arms 216A, 216B of the fiber tray insertion portion 244 define recesses to receive the index-matching adhesive. The adhesive may flow beneath the fiber tray 220 and secure the fiber tray 220 to the floor 239 of the fiber tray recess 218. Similarly, the exposed core 108 of the optical fibers 106 may be secured to the fiber support features 222 by applying an index-matching adhesive, such as epoxy, to the fiber support ledge 247 and corresponding fiber support features 222, thereby also index-matching the fiber ends 109 to the fiber-end datum surface 214.

In some embodiments, the fiber tray 220 may be secured to the TIR module 210 prior to actively positioning the fiber ends 109 in the fiber support features 222. For example, adhesive may first be applied to the adhesive receiving features 227, followed by active alignment of the fiber ends 109, and then securing the exposed core 108 to the fiber support features 222 with adhesive.

The TIR module 210 is secured to the lens module 120, as described above. The lens module 120 is secured to a PCB substrate 103 such that the lenses are aligned with the corresponding active optical components 140S, 140D also secured to the PCB substrate 103 as shown in FIGS. 7A and 7B, which are introduced and discussed below.

Fiber Hold-Down Features

Figure 14:
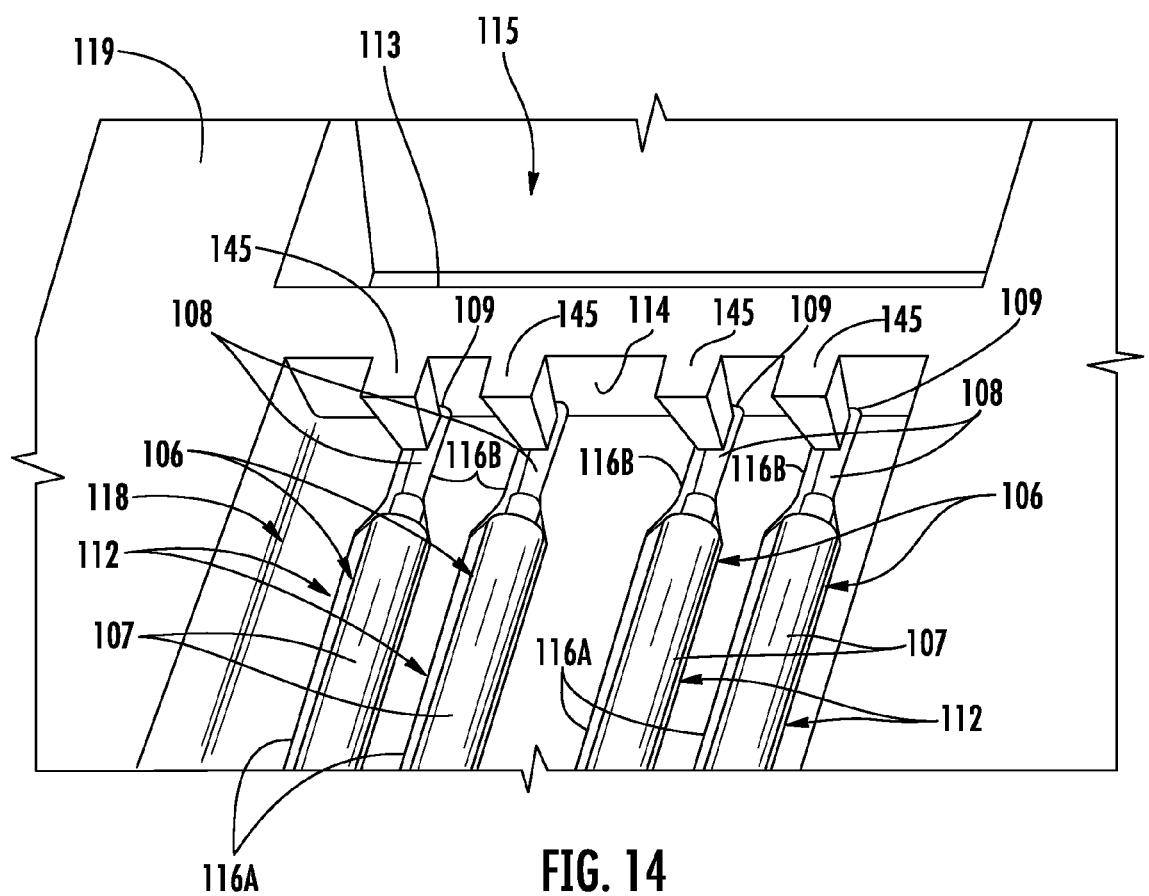
FIG. 14 is a close-up view of a plurality of optical fibers disposed in a plurality of fiber support features of a TIR module comprising fiber hold-down features.

Referring now to FIG. 14, the fiber-end datum surface 114 (or fiber-end datum surface 214 depicted in FIGS. 12A-12D) may include a plurality of fiber hold-down features 145. The fiber hold-down features 145 may be configured as protrusions extending from the fiber-end datum surface 114 and located above each module fiber support feature 112 (e.g., above the smaller, second segment 116B of the module fiber support features 112). The fiber hold-down features 145 may be provided to prevent the ends of the optical fibers 106 (e.g., the stripped portion 108) from being displaced from the module fiber support features 112 prior to being secured with adhesive or the like. Accordingly, the fiber-hold down features 145 may maintain the fiber ends in a known position.

The fiber hold-down feature 145 may have any suitable shape or size. The fiber hold-down feature may be chamfered, radiused, or angled on its underside surface to assist in guiding the optical fiber 106 into its final position. The fiber hold-down features 145 disclosed herein may be easier to mold than a bore for the fiber end 109, and also avoids the need for a cover to maintain the optical fibers 106 in place. However, a cover may also be used with the embodiments described herein.

As the fiber hold-down feature 145 is separated from the module fiber support features 112, there is a small gap where the optical fiber 106 is visible when in its final position, which may allow for easy visual inspection, and also allow for UV light to penetrate this area to fully cure UV-cured adhesive applied therein. The open structure provided by the fiber hold-down feature 145 and the module fiber support feature 112 may allow air to migrate from the region between the fiber end 109 and the fiber-end datum surface 114, thereby preventing bubbles from forming in the adhesive and the like, which may cause high optical loss and reflections of the optical signal.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A fiber optic module assembly comprising:
    a total-internal-reflection (TIR) module having a TIR body that is transmissive to light having a predetermined wavelength, the TIR body comprising:
        a first surface and a second surface that is opposite from the first surface; and
        a TIR surface extending from the first surface, wherein the TIR surface is operable to reflect an optical signal of light propagating within the TIR body by total internal reflection; and
    a lens module having a lens body that is transmissive to light having the predetermined wavelength, the lens body comprising:
        a first surface and a second surface that is opposite from the first surface, wherein the second surface of the TIR body is coupled to the first surface of the lens body; and
        a plurality of lens surfaces formed on the second surface of the lens body, wherein:
            at least the plurality of lens surfaces and the TIR surface define a plurality of lenses, each lens having a folded optical axis;
            the plurality of lens surfaces comprises one or more first lens surfaces and one or more second lens surfaces; and
            the one or more first lens surfaces are offset with respect to the one or more second lens surfaces in a direction that is orthogonal to the first surface of the lens body.

2. The fiber optic module assembly of claim 1, wherein the TIR body extends beyond an edge of the lens body.

3. The fiber optic module assembly of claim 1, wherein the lens body comprises at least one attachment feature configured to be coupled to a substrate.

4. The fiber optic module assembly of claim 1, wherein the second surface of the TIR body is adhered to the first surface of the lens body with an index matching adhesive.

5. The fiber optic module assembly of claim 1, wherein: the TIR body comprises at least one alignment feature at the second surface of the TIR body; and the lens body comprises at least one alignment feature at the first surface of the lens body that is configured to engage the at least one alignment feature of the TIR body.

6. The fiber optic module assembly of claim 5, wherein:
    the at least one alignment feature of the TIR body comprises an alignment pin and an alignment bore; and
    the at least one alignment feature of the lens body comprises an alignment bore configured to receive the alignment pin of the TIR body, and an alignment pin configured to be disposed in the alignment bore of the TIR body.

7. The fiber optic module assembly of claim 1, wherein the TIR body comprises a plurality of module fiber support features configured to receive a plurality of optical fibers and to align the plurality of optical fibers with the folded optical axes of the plurality of lenses.

8. The fiber optic module assembly of claim 7, wherein:
    the TIR body comprises a fiber tray recess; and
    the fiber optic module assembly further comprises a fiber tray comprising:
        a first surface; and
        a plurality of fiber support features on the first surface, wherein the plurality of fiber support features is configured to receive the plurality of optical fibers, and the fiber tray is disposed in the fiber tray recess of the TIR body such that the plurality of fiber support features of the fiber tray is substantially aligned with the plurality of module fiber support features of the TIR body.

9. A fiber optic module assembly comprising:
    a total-internal-reflection (TIR) module having a TIR body that is transmissive to light having a predetermined wavelength, the TIR body comprising:
        a first surface and a second surface that is opposite from the first surface;
        a TIR surface extending from the first surface, wherein the TIR surface is operable to reflect an optical signal of light propagating within the TIR body by total internal reflection;
        a fiber-end datum surface located proximate the TIR surface such that optical signals propagating through the fiber-end datum surface are reflected at the TIR surface; and
        at least one module fiber support feature respectively terminating at the fiber-end datum surface, wherein the plurality of optical fibers is disposed in the respective module fiber support features and fiber-ends of the plurality of optical fibers are positioned at the fiber-end datum surface; and
    a lens module having a lens body that is transmissive to light having the predetermined wavelength, the lens body comprising:
        a first surface and a second surface that is opposite from the first surface, wherein the second surface of the TIR body is coupled to the first surface of the lens body; and
        a plurality of lens surfaces formed on the second surface of the lens body, wherein:
            the plurality of lens surfaces, the TIR surface, the fiber-end datum surface and intervening portions of the lens body and the TIR body define a plurality of lenses, each lens having a folded optical axis;
            the plurality of lens surfaces comprises one or more first lens surfaces and one or more second lens surfaces;

the one or more first lens surfaces are offset with respect to the one or more second lens surfaces in a direction that is orthogonal to the first surface of the lens body; and the plurality of optical fibers is substantially aligned with the folded optical axes of the plurality of lenses.

10. The fiber optic module assembly of claim 9, wherein:
the TIR body comprises at least one alignment feature at the second surface of the TIR body; and
the lens body comprises at least one alignment feature at the first surface of the lens body that is configured to engage the at least one alignment feature of the TIR body.

11. The fiber optic module assembly of claim 10, wherein:
the at least one alignment feature of the TIR body comprises an alignment pin and an alignment bore; and
the at least one alignment feature of the lens body comprises an alignment bore configured to receive the alignment pin of the TIR body, and an alignment pin configured to be disposed in the alignment bore of the TIR body.

12. The fiber optic module assembly of claim 10, wherein the at least one alignment features of the TIR body and the lens body align the plurality of module fiber support features with the folded optical axes of the plurality of lenses.

13. The fiber optic module assembly of claim 9, wherein the TIR body comprises a fiber insertion edge, and the plurality of module fiber support features extend between the fiber insertion edge and the fiber-end datum surface.

14. The fiber optic module assembly of claim 9, wherein each fiber support feature of the plurality of module fiber support features comprises a coating portion that tapers to a core portion.

15. The fiber optic module assembly of claim 9, wherein the TIR body comprises a plurality of fiber hold-down features extending from the fiber-end datum surface and positioned above the plurality of fiber support features.

16. The fiber optic module assembly of claim 9, wherein the lens body comprises at least one attachment feature configured to be coupled to a substrate.

17. The fiber optic module assembly of claim 9, wherein the second surface of the TIR body is adhered to the first surface of the lens body with an index matching adhesive.

18. An optical-electrical connector comprising:
a substrate comprising a surface and a plurality of active optical components coupled to the surface;
a plurality of optical fibers, each optical fiber having a core surrounded by an outer coating, wherein each optical fiber comprises a stripped region where the core is exposed for a length from a fiber-end;
a total-internal-reflection (TIR) module having a TIR body that is transmissive to light having a predetermined wavelength, the TIR body comprising:
a first surface and a second surface that is opposite from the first surface;
a TIR surface extending from the first surface, wherein the TIR surface is operable to reflect an optical signal of light propagating within the TIR body by total internal reflection;
a fiber-end datum surface located proximate the TIR surface such that optical signals propagating through the fiber-end datum surface are reflected at the TIR surface; and
a plurality of module fiber support features configured to receive a plurality of optical fibers, wherein the plurality of module fiber support features terminates at the fiber-end datum surface; and
a lens module having a lens body that is transmissive to light having the predetermined wavelength, the lens body comprising:
a first surface and a second surface that is opposite from the first surface, wherein the second surface of the TIR body is coupled to the first surface of the lens body;
a plurality of lens surfaces formed on the second surface of the lens body, wherein:
the plurality of lens surfaces, the TIR surface, the fiber-end datum surface and intervening portions of the lens body and the TIR body define a plurality of lenses, each lens having a folded optical axis;
the plurality of lens surfaces comprises one or more first lens surfaces and one or more second lens surfaces;
the one or more first lens surfaces are offset with respect to the one or more second lens surfaces in a direction that is orthogonal to the first surface of the lens body;
the plurality of module fiber support features are substantially aligned with the folded optical axes of the plurality of lenses; and
the lens body is coupled to the surface of the substrate such that the folded lens axes of the plurality of lenses are substantially aligned with device axes of the plurality of active optical components.

* * * * *